United States Patent
Chae et al.

(10) Patent No.: US 9,787,438 B2
(45) Date of Patent: Oct. 10, 2017

(54) TTI BUNDLING METHOD IN WIRELESS ACCESS SYSTEMS AND APPARATUS FOR SAME

(71) Applicant: LG ELECTRONICS INC., Seoul (KR)

(72) Inventors: Hyukjin Chae, Anyang-si (KR); Seungmin Lee, Anyang-si (KR); Hakseong Kim, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 20 days.

(21) Appl. No.: 14/391,620

(22) PCT Filed: Apr. 9, 2013

(86) PCT No.: PCT/KR2013/002958
§ 371 (c)(1),
(2) Date: Oct. 9, 2014

(87) PCT Pub. No.: WO2013/162189
PCT Pub. Date: Oct. 31, 2013

(65) Prior Publication Data
US 2015/0071209 A1    Mar. 12, 2015

Related U.S. Application Data

(60) Provisional application No. 61/639,101, filed on Apr. 27, 2012.

(51) Int. Cl.
*H04W 72/04* (2009.01)
*H04L 1/18* (2006.01)
(Continued)

(52) U.S. Cl.
CPC .......... *H04L 1/1816* (2013.01); *H04L 1/1614* (2013.01); *H04L 1/189* (2013.01);
(Continued)

(58) Field of Classification Search
CPC ...... H04W 28/06; H04W 72/04; H04L 29/06; H04L 1/18
See application file for complete search history.

(56) References Cited

U.S. PATENT DOCUMENTS

2009/0257408 A1    10/2009   Zhang et al.
2010/0042884 A1*   2/2010    Kuo ...................... H04W 52/48
                                                    714/748
(Continued)

FOREIGN PATENT DOCUMENTS

KR    10-2010-0021388 A    2/2010
WO    WO 2009/116760 A2    9/2009
(Continued)

OTHER PUBLICATIONS

3GPP TSG-RAN WG1 , Mar. 26, 2012, Intel Corportation , Enhancement Solutions for UL VoIP, p. 1-6.*
(Continued)

*Primary Examiner* — Lakeram Jangbahadur
(74) *Attorney, Agent, or Firm* — Birch, Stewart, Kolasch & Birch, LLP

(57) ABSTRACT

The present invention relates to a transmission time interval (TTI) bundling method in wireless access systems and to an apparatus for same. In particular, the TTI bundling method includes the following steps: a terminal receives information indicating the bundling size value from a base station; the terminal automatically re-transmits packets through a predetermined number of TTIs following four TTIs without the reception of Acknowledgement/Negative-ACK (ACK/NACK) information for the packets from the base station;
(Continued)

the terminal receives the ACK/NACK information for the packets from the base station; and the terminal retransmits packets in a Hybrid Automatic Repeat and Request (HARQ) scheme when receiving the NACK, wherein the predetermined number of TTIs is determined according to the bundling size value.

10 Claims, 20 Drawing Sheets

(51) Int. Cl.
*H04L 1/16* (2006.01)
*H04L 5/00* (2006.01)
*H04L 29/06* (2006.01)

(52) U.S. Cl.
CPC .......... *H04L 1/1854* (2013.01); *H04L 1/1887* (2013.01); *H04L 5/0055* (2013.01); *H04L 65/1096* (2013.01); *H04W 72/0406* (2013.01); *H04W 72/0446* (2013.01)

(56) References Cited

U.S. PATENT DOCUMENTS

| | | | |
|---|---|---|---|
| 2010/0042888 A1 | 2/2010 | Kuo | |
| 2011/0038352 A1* | 2/2011 | Bergman | H04L 1/1812 370/331 |
| 2011/0055652 A1* | 3/2011 | Park | H04L 1/1819 714/748 |
| 2011/0211522 A1* | 9/2011 | Chung | H04L 1/1822 370/315 |

FOREIGN PATENT DOCUMENTS

WO    WO 2009/131509 A1    10/2009
WO    WO 2010/022070 A1    2/2010

OTHER PUBLICATIONS

Intel Corporation, "Discussion on Potential Coverage Enhancement Solutions for UL VoIP," 3GPP TSG-RAN WG1 #68bis, R1-121526, Jeju, Korea, Mar. 26-30, 2012, pp. 1-6.

\* cited by examiner

FIG. 8
(a)
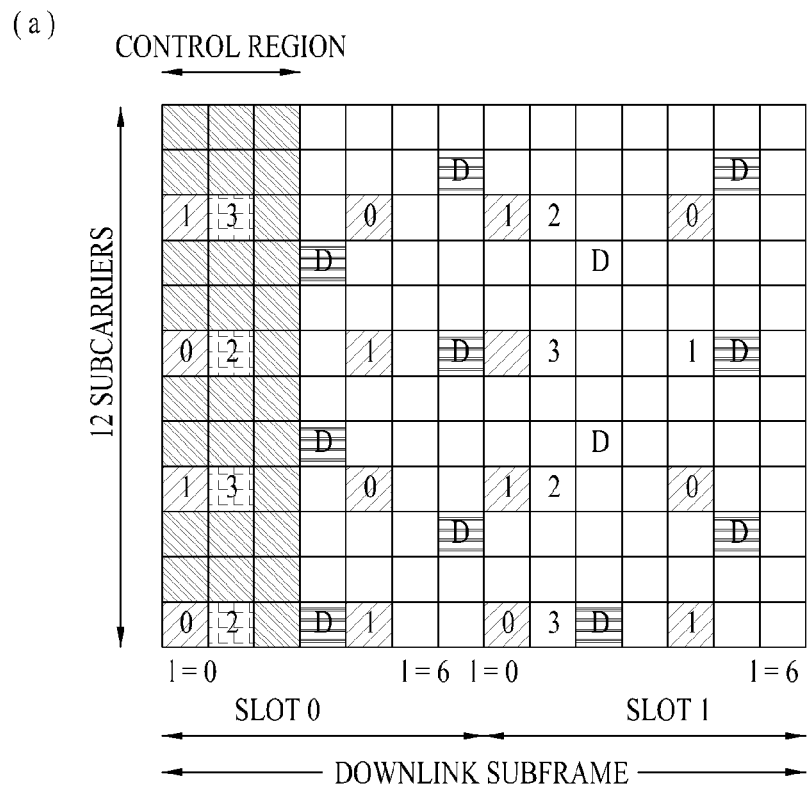
(b)
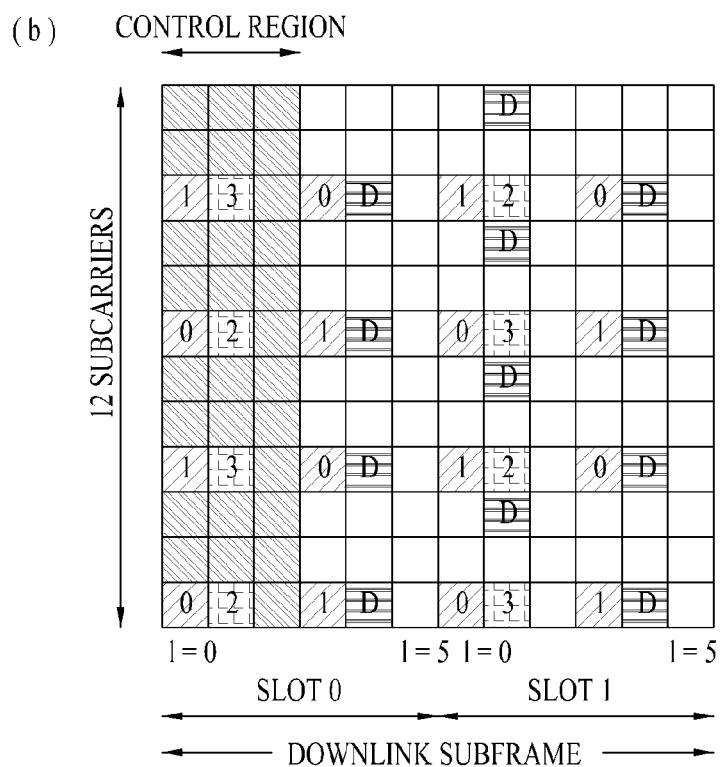

FIG. 11
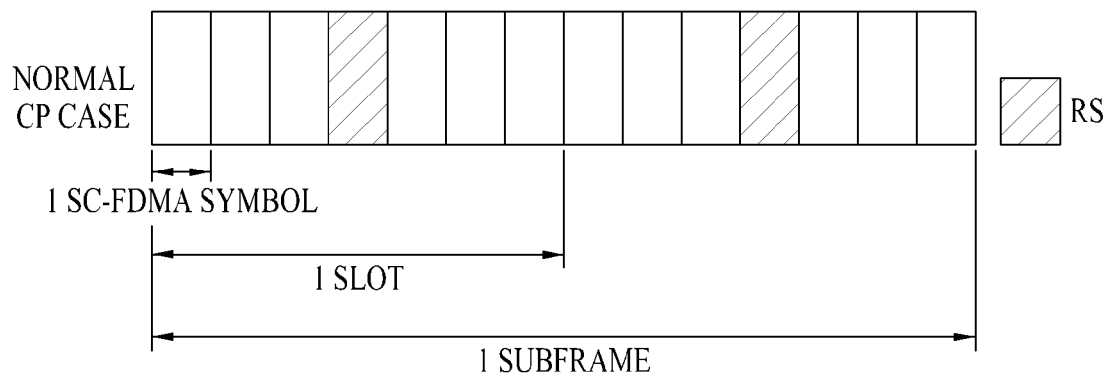
(a)
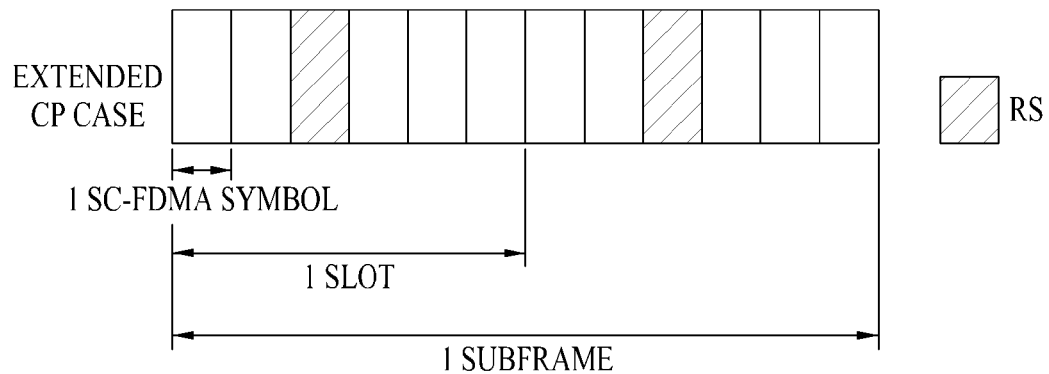
(b)

FIG. 12
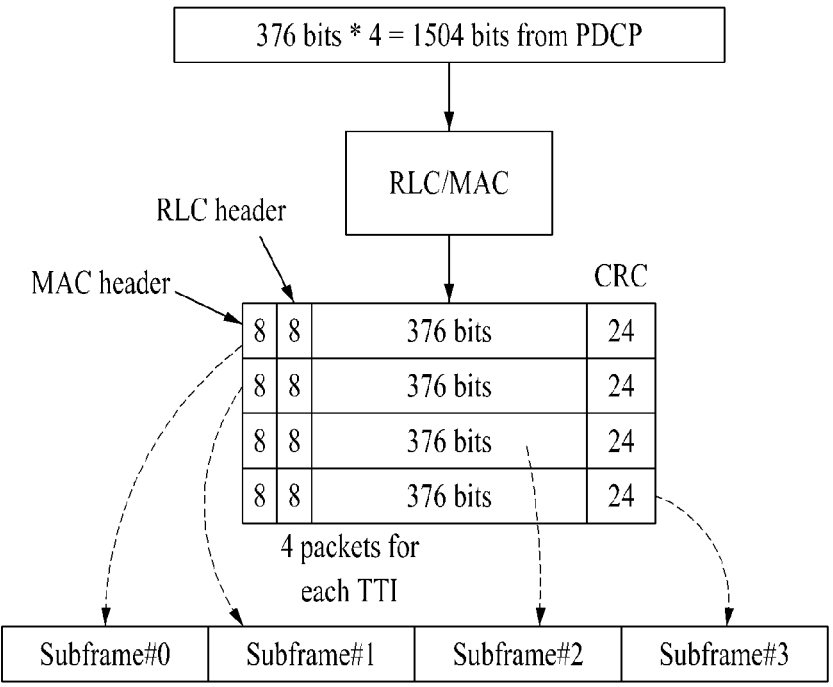
(a) Non-bundling
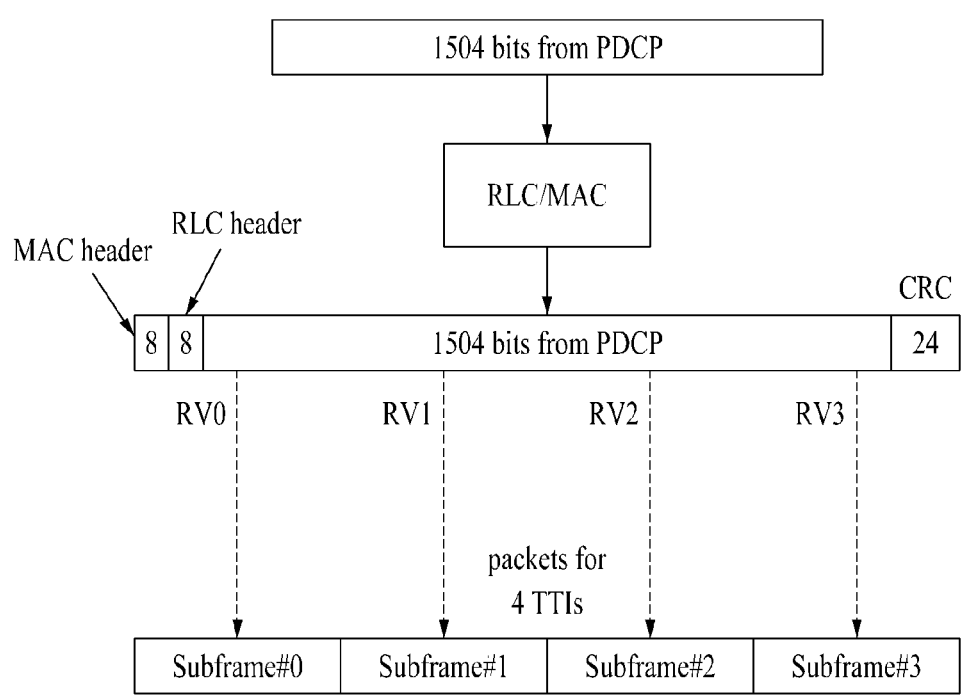
(b) 4 TTI bundling

TTI BUNDLING METHOD IN WIRELESS ACCESS SYSTEMS AND APPARATUS FOR SAME

CROSS REFERENCE TO RELATED APPLICATIONS

This application is the National Phase of PCT International Application No. PCT/KR2013/002958, filed on Apr. 9, 2013, which claims priority under 35 U.S.C. 119(e) to U.S. Provisional Application No. 61/639,101, filed on Apr. 27, 2012, all of which are hereby expressly incorporated by reference into the present application.

TECHNICAL FIELD

The present invention relates to a wireless access system, and more particularly, to an improved method for bundling Transmission Time Intervals (TTIs) in a wireless access system and an apparatus supporting the same.

BACKGROUND ART

Mobile communication systems were developed to provide voice service, ensuring the mobility of users. The mobile communication systems have extended their range of services to data service as well as voice service. Now the mobile communication systems can provide high-speed data service. However, since the existing mobile systems suffer from lack of resources and users demand faster services, an advanced mobile communication system is required.

In Voice over Internet Protocol (VoIP) of a mobile communication system, the overhead of control signals is one of significant factors that reduce VoIP capacity. Particularly, multiple retransmissions may occur at a cell edge. The resulting decrease of service quality and increase of overhead eventually degrades VoIP performance. To overcome the problem, a $3^{rd}$ Generation Partnership Project (3GPP) Long Term Evolution (LTE)/LTE-Advanced (LTE-A) system defines a TTI bundling technique that transmits the same data continuously in multiple TTIs to thereby reduce a transmission error probability and increase VoIP performance at a service boundary area.

DISCLOSURE

Technical Problem

If more TTIs are bundled according to a 4-TTI bundling technique defined for a conventional $3^{rd}$ Generation Partnership Project (3GPP) Long Term Evolution (LTE)/LTE-Advanced (LTE-A) system, collision may occur with a new Voice over Internet Protocol (VoIP) packet in an existing Hybrid Automatic Repeat and reQuest (HARQ) process.

An object of the present invention devised to solve the conventional problem is to provide a method and apparatus for bundling TTIs to prevent collision with a new VoIP packet and extend the coverage of a VoIP service in a wireless access system.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method for performing Transmission Time Interval (TTI) bundling in a wireless access system includes receiving information indicating a bundling size from a Base Station (BS) by a User Equipment (UE), initially transmitting a packet in 4 TTIs by the UE, automatically retransmitting the packet in a predetermined number of TTIs following the 4 TTIs without receiving Acknowledgement/Negative Acknowledgement (ACK/NACK) information for the packet from the BS by the UE, receiving ACK/NACK information for the packet from the BS by the UE, and retransmitting the packet by Hybrid Automatic Repeat and reQuest (HARQ) by the UE, upon receipt of NACK information from the BS. The predetermined number of TTIs is determined according to the bundling size.

In another aspect of the present invention, a UE for performing TTI bundling in a wireless access system includes a Radio Frequency (RF) unit for transmitting and receiving radio signals, and a processor. The processor is configured to receive information indicating a bundling size from a BS, initially transmit a packet in 4 TTIs, automatically retransmit the packet in a predetermined number of TTIs following the 4 TTIs without receiving ACK/NACK information for the packet from the BS, receive ACK/NACK information for the packet from the BS, and retransmit the packet by HARQ, upon receipt of NACK information from the BS. The predetermined number of TTIs is determined according to the bundling size.

The ACK/NACK information may be transmitted after 4 TTIs from the 4 TTIs used for the initial transmission of the packet.

If the bundling size is 5 or larger, the predetermined number of TTIs may be 8 and if the bundling size is less than 5, the predetermined number of TTIs may be 4.

The ACK/NACK information may be transmitted after 4 TTIs from the 4 TTIs used for the automatic retransmission.

A period of the HARQ retransmission may be 16 TTIs.

The packet may be a Voice over Internet Protocol (VoIP) packet.

Advantageous Effects

According to the embodiments of the present invention, the coverage of a VoIP service can be extended, preventing collision with a new Voice over Internet Protocol (VoIP) packet by improved Transmission Time Interval (TTI) bundling in a wireless access system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 8 illustrates patterns of downlink Reference Signals (RSs) mapped to a pair of downlink Resource Blocks (RBs) in the 3GPP LTE system;

FIG. 11 illustrates structures of a subframe for transmitting a Demodulation RS (DMRS);

FIG. 12 is a view comparing non-Transmission Time Interval (TTI) bundling with TTI bundling in terms of redundancy;

BEST MODE FOR CARRYING OUT THE INVENTION

Figure 1:
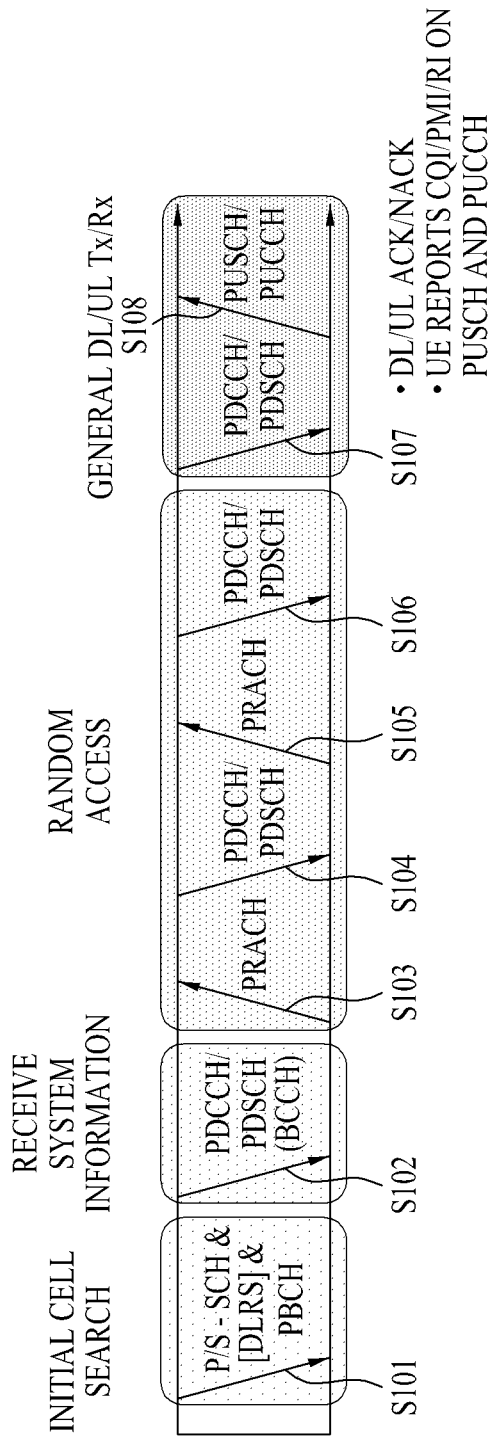
FIG. 1 illustrates physical channels and a general signal transmission method using the physical channels in a $3^{rd}$ Generation Partnership Project (3GPP) Long Term Evolution (LTE) system.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the invention.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc. The term 'relay' may be used interchangeably with 'Relay Node (RN)', 'Relay Station (RS)', etc. The term 'terminal' may be replaced with the term 'UE', 'Mobile Station (MS)', 'Mobile Subscriber Station (MSS)', 'Subscriber Station (SS)', Advanced Mobile Station (AMS), Wireless Terminal (WT), Machine-Type Communication (MTC) device, Machine-to-Machine (M2M) device, Device-to-Device (D2D) device, etc.

Specific terms used for the embodiments of the present invention are provided to help the understanding of the present invention. These specific terms may be replaced with other terms within the scope and spirit of the present invention.

The embodiments of the present invention may be supported by standard documents disclosed for at least one of wireless access systems, Institute of Electrical and Electronics Engineers (IEEE) 802, $3^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention may be supported by those documents. Further, all terms as set forth herein may be explained by the standard documents.

Techniques described herein may be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA), etc. UTRA is a part of Universal Mobile Telecommunications System (UMTS). 3GPP LTE is a part of Evolved-UMTS (E-UMTS) using E-UTRA. 3GPP LTE employs OFDMA for downlink and SC-FDMA for uplink. LTE-A is an evolution of 3GPP LTE.

While the embodiments of the present invention will be described below in the context of a 3GPP LTE/LTE-A system, this is purely exemplary and thus should not be constructed as limiting the present invention.

3GPP LTE/LTE-A System to which the Present Invention is Applicable

FIG. 1 illustrates physical channels and a general method for transmitting signals on the physical channels in a 3GPP LTE system.

Referring to FIG. 1, when a UE is powered on or enters a new cell, the UE performs initial cell search (S101). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB. During the initial cell search, the UE may monitor a DownLink (DL) channel state by receiving a DL Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S102).

Subsequently, the UE may perform a random access procedure with the eNB to complete setup of a connection to the eNB (S103 to S106). In the random access procedure, the UE may transmit a preamble on a Physical Random Access Channel (PRACH) (S103) and may receive a response message to the preamble on a PDCCH and a PDSCH associated with the PDCCH (S104). In the case of contention-based random access, the UE may additionally perform a contention resolution procedure including transmission of a PRACH (S105) and reception of a PDCCH and a PDSCH associated with the PDCCH (S106).

After the above procedure, the UE may receive a PDCCH and/or a PDSCH from the eNB (S107) and transmit a Physical Uplink Shared Channel (PDSCH) and/or a Physical Uplink Control Channel (PUCCH) to the eNB (S108), which is a general DL and UpLink (UL) signal transmission procedure.

Control information that a UE transmits to an eNB is collectively referred to as Uplink Control Information (UCI). The UCI includes Hybrid Automatic Repeat and reQuest Acknowledgment/Negative Acknowledgment (HARQ ACK/NACK), Scheduling Request (SR), Channel Quality Indication (CQI), Precoding Matric Index (PMI), Rank Indication (RI), etc.

Although UCI is transmitted periodically on a PUCCH in the LTE system, the UCI may be transmitted on a PUSCH when control information and traffic data should be transmitted at the same time. Also, the UCI may be transmitted aperiodically on a PUSCH upon request/instruction of a network.

Figure 2:
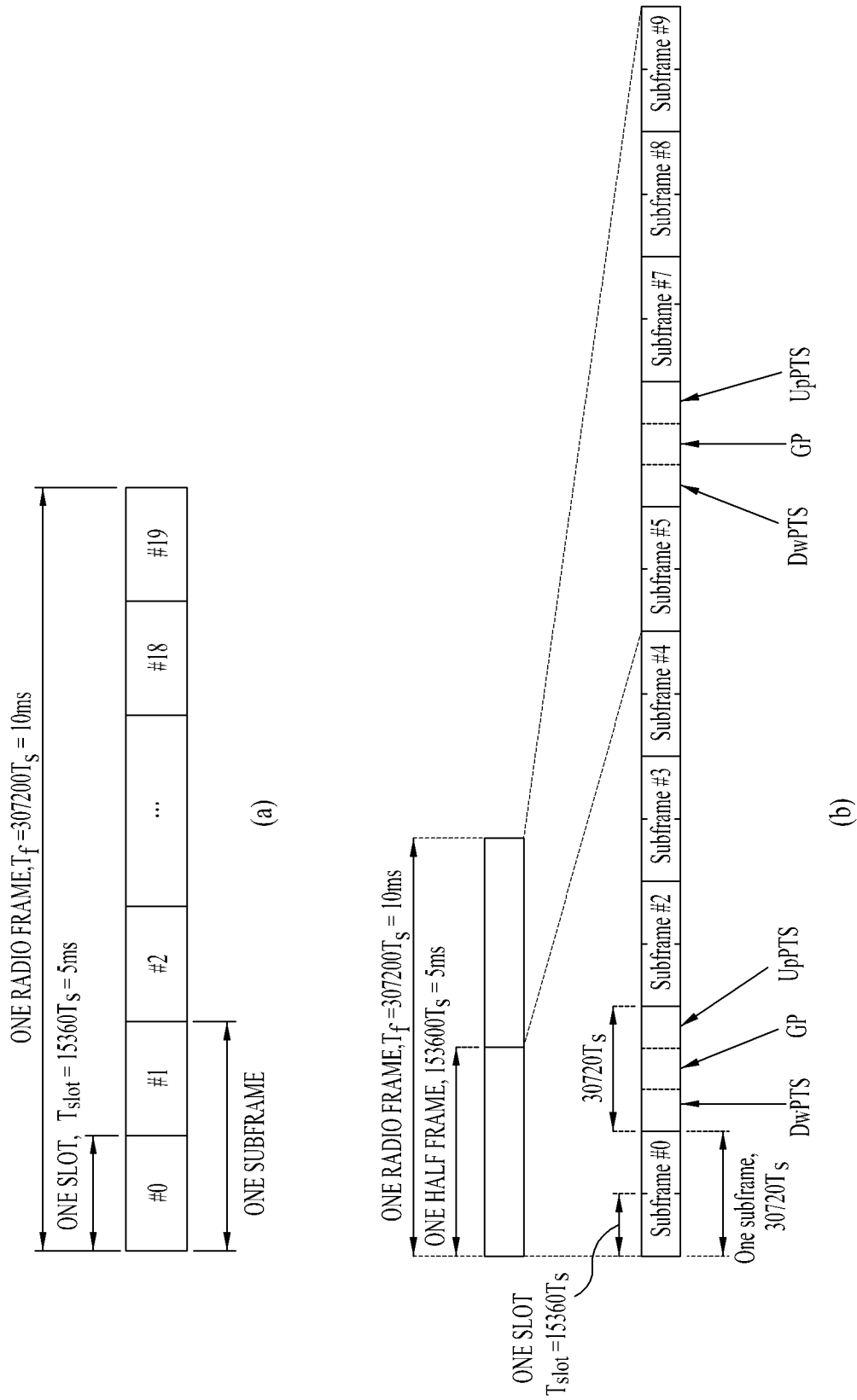
FIG. 2 illustrates a radio frame structure in the 3GPP LTE system.

FIG. 2 illustrates a radio frame structure in the 3GPP LTE system.

In a cellular Orthogonal Frequency Division Multiplexing (OFDM) wireless packet communication system, UL/DL data packets are transmitted in subframes. One subframe is defined as a predetermined time interval including a plurality of OFDM symbols. The 3GPP LTE standards support a type 1 radio frame structure applicable to Frequency Division Duplex (FDD) and a type 2 radio frame structure applicable to Time Division Duplex (TDD).

FIG. 2(a) is a diagram illustrating the structure of the type 1 radio frame. A DL radio frame includes 10 subframes, each subframe including two slots in the time domain. A time required for transmitting one subframe is defined as a Transmission Time Interval (TTI). For example, one subframe may be 1 ms long and one slot may be 0.5 ms long. One slot includes a plurality of OFDM symbols in the time domain and a plurality of Resource Blocks (RBs) in the frequency domain. Since the 3GPP LTE system uses OFDMA on DL, an OFDM symbol represents one symbol period. An OFDM symbol may be called an SC-FDMA symbol or symbol period. An RB is a resource allocation unit including a plurality of contiguous subcarriers in one slot.

The number of OFDM symbols included in one slot may be changed according to the configuration of a Cyclic Prefix (CP). There are two types of CPs, extended CP and normal CP. For example, if each OFDM symbol is configured to include a normal CP, one slot may include 7 OFDM symbols. If each OFDM symbol is configured to include an extended CP, the length of an OFDM symbol is increased and thus the number of OFDM symbols included in one slot is less than that in the case of normal CP. In the case of extended CP, for example, one slot may include 6 OFDM symbols. If a channel state is instable as is the case with a fast UE, the extended CP may be used in order to further reduce inter-symbol interference.

In the case of normal CP, since one slot includes 7 OFDM symbols, one subframe includes 14 OFDM symbols. The first up to three OFDM symbols of each subframe may be allocated to a PDCCH and the remaining OFDM symbols may be allocated to a PDSCH.

FIG. 2(b) illustrates the structure of the type 2 radio frame. The type 2 radio frame includes two half frames, each half frame including 5 subframes, a Downlink Pilot Time Slot (DwPTS), a Guard Period (GP), and an Uplink Pilot Time Slot (UpPTS). One subframe is divided into two slots. The DwPTS is used for initial cell search, synchronization, or channel estimation at a UE, and the UpPTS is used for channel estimation and UL transmission synchronization with a UE at an eNB. The GP is used to cancel UL interference between UL and DL, caused by the multi-path delay of a DL signal.

The structures of radio frames are only exemplary. Accordingly, the number of subframes in a radio frame, the number of slots in a subframe, and the number of symbols in a slot may be changed in various manners.

Figure 3:
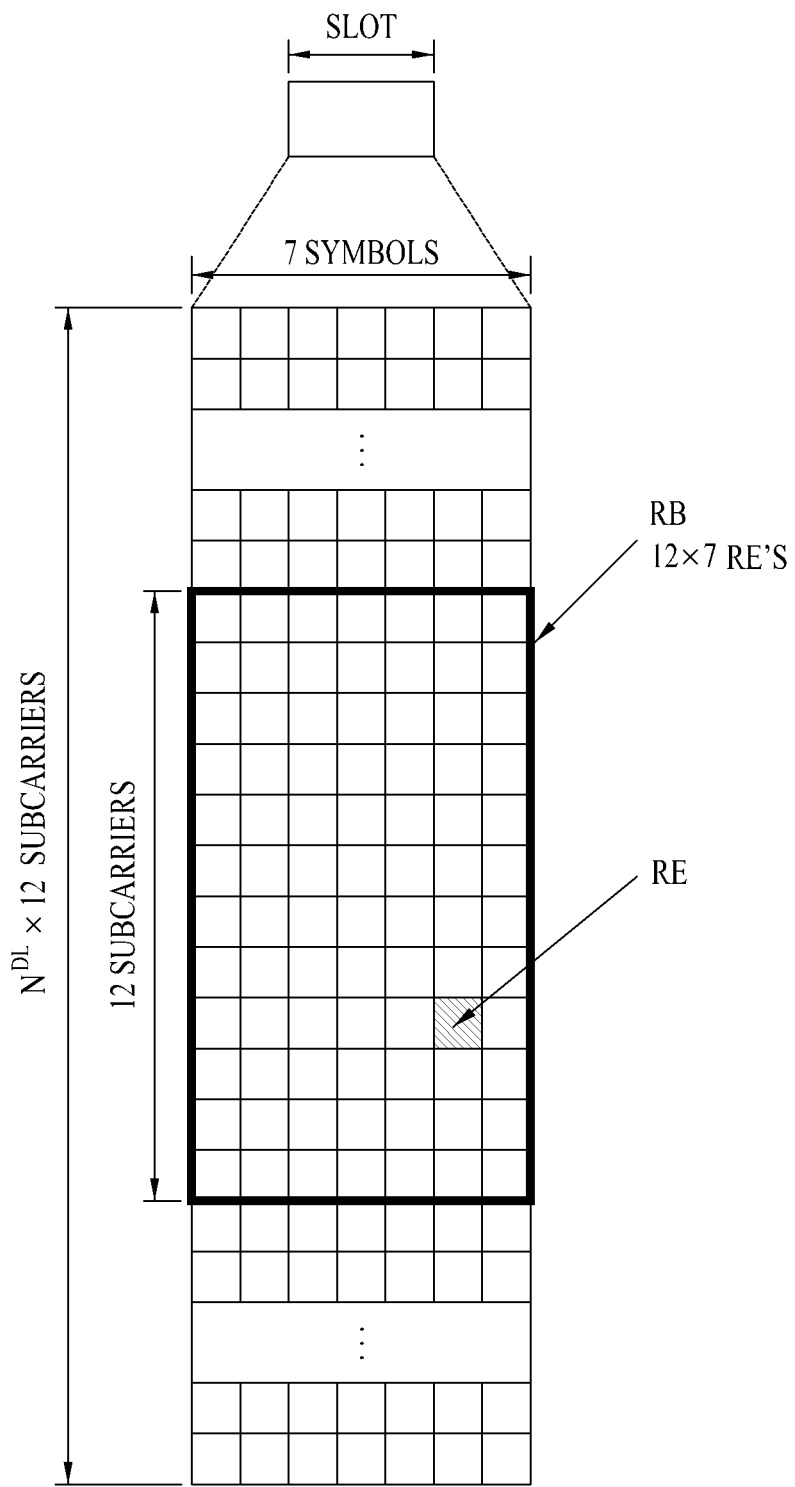
FIG. 3 illustrates a structure of a downlink resource grid for the duration of one downlink slot.

FIG. 3 illustrates the structure of a DL resource grid for the duration of one DL slot.

Referring to FIG. 3, one DL slot includes a plurality of OFDM symbols in the time domain. Herein, a DL slot has 7 OFDM symbols in the time domain and an RB includes 12 subcarriers in the frequency domain, which does not limit the present invention.

Each element of the resource grid is referred to as a Resource Element (RE). An RB includes 12×7 REs. The number of RBs in a DL slot, $N_{DL}$ depends on a DL transmission bandwidth. A UL slot may have the same structure as a DL slot.

Figure 4:
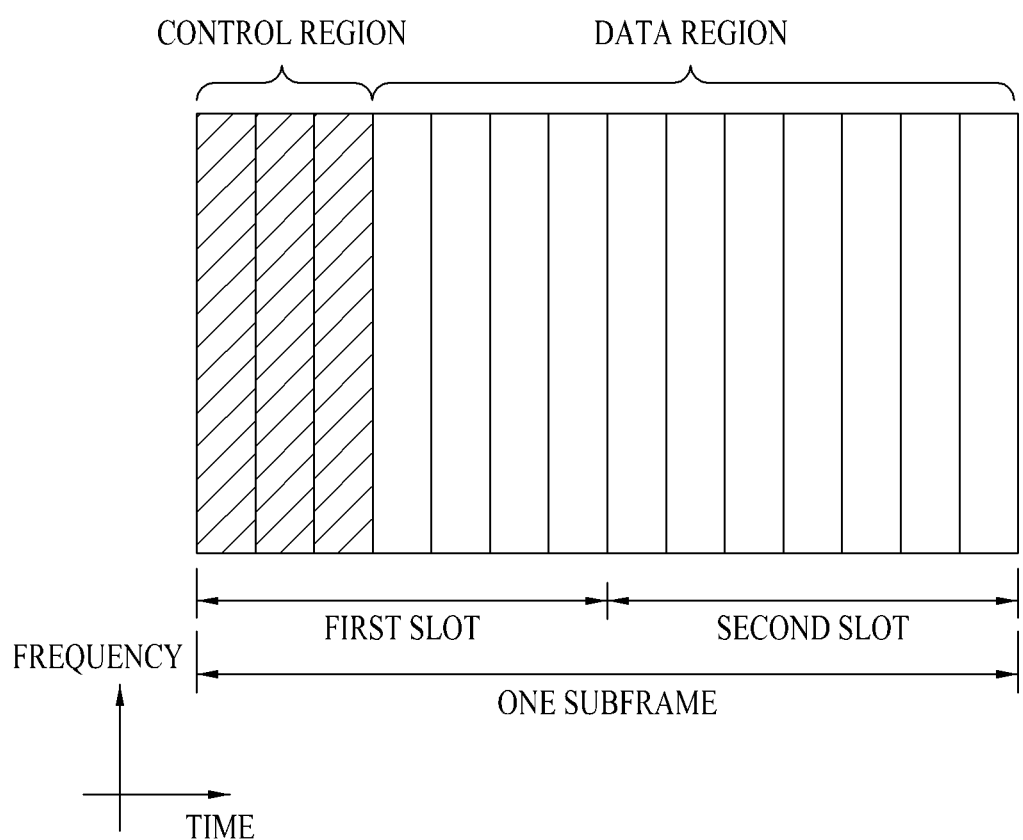
FIG. 4 illustrates a structure of a downlink subframe.

FIG. 4 illustrates the structure of a DL subframe.

Referring to FIG. 4, up to three OFDM symbols at the start of the first slot of a DL subframe are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid automatic repeat and request (ARQ) Indicator Channel (PHICH).

The PCFICH is located in the first OFDM symbol of a subframe, carrying information about the number of OFDM symbols used for transmission of control channels in the subframe. The PHICH delivers an HARQ ACK/NACK signal as a response to a UL transmission. Control information carried on the PDCCH is called Downlink Control Information (DCI). The DCI transports UL resource allocation information, DL resource allocation information, or UL transmission power control commands for UE groups.

The PDCCH delivers information (a DL grant) about resource allocation and a transport format for a Downlink Shared Channel (DL-SCH), resource allocation information (a UL grant) about an Uplink Shared Channel (UL-SCH), paging information of a Paging Channel (PCH), system information on the DL-SCH, information about resource allocation for a higher-layer control message such as a random access response transmitted on the PDSCH, a set of transmission power control commands for individual UEs of a UE group, Voice Over Internet Protocol (VoIP) activation information, etc. A plurality of PDCCHs may be transmitted in the control region. A UE may monitor a plurality of PDCCHs. A PDCCH is formed by aggregation of one or more consecutive Control Channel Elements (CCEs). A CCE is a logical allocation unit used to provide a PDCCH at a coding rate based on the state of a radio channel. A CCE includes a plurality of RE Groups (REGs). The format of a PDCCH and the number of available bits for the PDCCH are determined according to the relationship between the number of CCEs and a coding rate provided by the CCEs.

An eNB determines a PDCCH format according to DCI to be transmitted to a UE and adds a Cyclic Redundancy Check (CRC) to control information. The CRC is masked by an ID known as a Radio Network Temporary Identifier (RNTI) according to the owner or usage of the PDCCH. If the PDCCH is destined for a specific UE, the CRC may be masked by a cell-RNTI (C-RNTI) of the UE. If the PDCCH carries a paging message, the CRC of the PDCCH may be masked by a Paging Indicator Identifier (P-RNTI). If the PDCCH carries system information, particularly, a System Information Block (SIB), its CRC may be masked by a system information ID, System Information RNTI (SI-RNTI). To indicate that the PDCCH carries a random access response to a random access preamble transmitted by a UE, the CRC of the PDCCH may be masked by a Random Access-RNTI (RA-RNTI).

Figure 5:
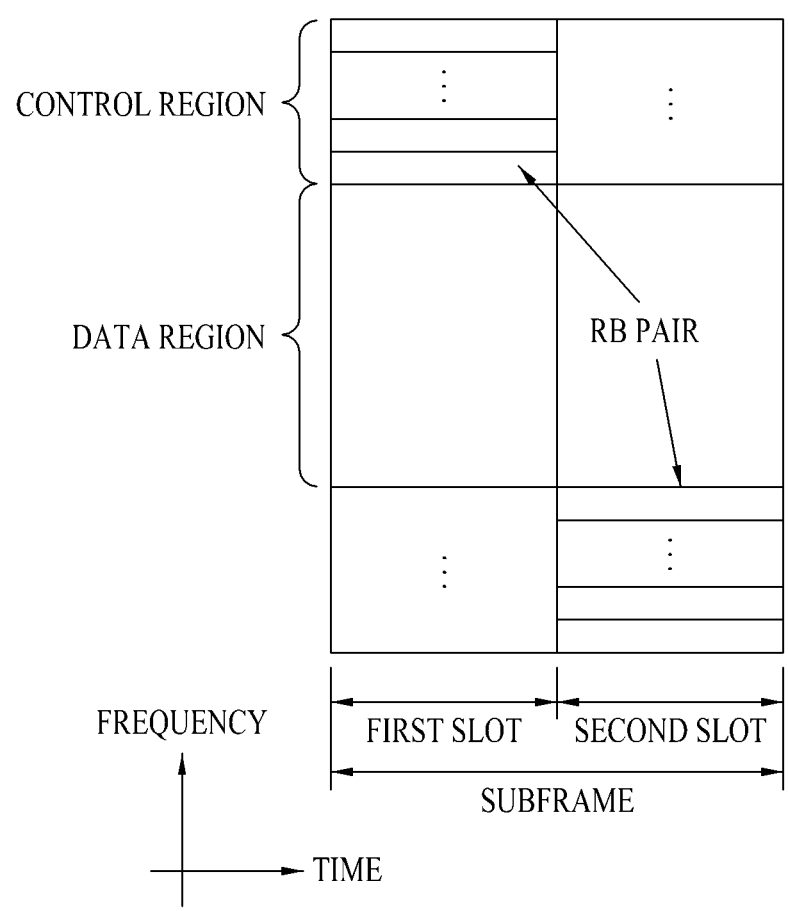
FIG. 5 illustrates a structure of an uplink subframe.

FIG. 5 illustrates the structure of a UL subframe.

Referring to FIG. 5, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH frequency-hops over a slot boundary.

Multiple Input Multiple Output (MIMO) System

Figure 6:
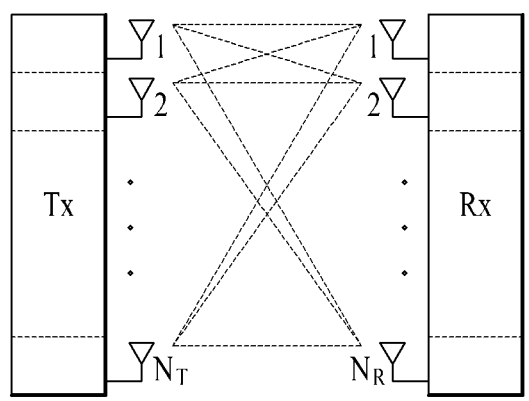
FIGS. 6 and 7 illustrate a configuration of a Multiple Input Multiple Output (MIMO) wireless communication system.
Figure 7:
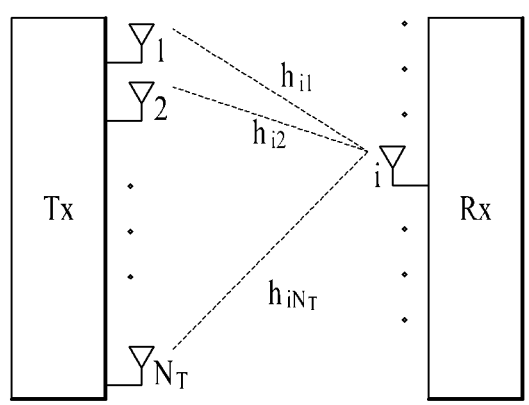

FIGS. 6 and 7 illustrate the configuration of a MIMO wireless communication system.

Referring to FIG. 6, when the number of Transmission (Tx) antennas and the number of Reception (Rx) antennas are increased to $N_T$ and $N_R$, respectively at both a transmitter and a receiver, a theoretical channel transmission capacity increases in proportion to the number of antennas, compared to the use of a plurality of antennas at only one of the transmitter and the receiver. Therefore, transmission rate and frequency efficiency may be remarkably increased. Along with the increase of channel transmission capacity, the transmission rate may be increased in theory to the product of a maximum transmission rate $R_o$ that may be achieved with a single antenna and a rate increase rate $R_i$.

$$R_i = \min(N_T, N_R) \qquad \text{[Equation 1]}$$

For instance, a MIMO communication system with four Tx antennas and four Rx antennas may achieve a four-fold increase in transmission rate theoretically, relative to a single-antenna wireless communication system. Since the theoretical capacity increase of the MIMO wireless communication system was verified in the middle 1990s, many techniques have been actively developed to increase data rate in real implementation. Some of the techniques have already been reflected in various wireless communication standards including standards for 3G mobile communications, future-generation Wireless Local Area Network (WLAN), etc.

Concerning the research trend of MIMO up to now, active studies are underway in many respects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system with $N_T$ Tx antennas and $N_R$ Rx antennas will be described in detail through mathematical modeling.

Regarding a transmission signal, up to $N_T$ pieces of information may be transmitted through the $N_T$ Tx antennas, as expressed as the following vector.

$$s = [s_1, s_2, \ldots, s_{N_T}]^T \qquad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector may be given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

$N_T$ transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector x, which may be determined by $$x = \begin{bmatrix} x_1 \\ x_2 \\ \vdots \\ x_i \\ \vdots \\ x_{N_T} \end{bmatrix} = \qquad \text{[Equation 5]}$$

$$\begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

Here, $w_{ij}$ denotes a weight between a $j^{th}$ piece of information and an $i^{th}$ Tx antenna. W is referred to as a precoding matric.

Given $N_R$ Rx antennas, signals received at the Rx antennas, $y_1, y_2, \ldots, y_{N_R}$, may be represented as the following vector.

$$y = [y_1, y_2, \ldots, y_{N_R}]^T \qquad \text{[Equation 6]}$$

When channels are modeled in the MIMO wireless communication system, they may be distinguished according to the indexes of Tx and Rx antennas. A channel between a $j^{th}$ Tx antenna and an $i^{th}$ Rx antenna is denoted by $h_{ij}$. One thing to note herein is that the index of an Rx antenna precedes the index of a Tx antenna in $h_{ij}$.

FIG. 7 illustrates channels from $N_T$ Tx antennas to an $i^{th}$ Rx antenna. The channels may be collectively represented as a vector or a matrix. Referring to FIG. 7, the channels from the $N_T$ Tx antennas to the $i^{th}$ Rx antenna may be expressed as [Equation 7].

$$h_i^T = [h_{i1}, h_{i2}, \ldots, h_{iN_T}] \qquad \text{[Equation 7]}$$

Hence, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \qquad \text{[Equation 8]}$$

Actual channels experience the above channel matrix H and then are added with Additive White Gaussian Noise (AWGN). The AWGN $n_1, n_2, \ldots, n_{N_R}$, added to the $N_R$ Rx antennas is given as the following vector.

$$n = [n_1, n_2, \ldots, n_{N_R}]^T \qquad \text{[Equation 9]}$$

From the above mathematical modeling, the received signal vector is given as $$y = \begin{bmatrix} y_1 \\ y_2 \\ \vdots \\ y_i \\ \vdots \\ y_{N_R} \end{bmatrix} = \qquad \text{[Equation 10]}$$

$$\begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n$$

The numbers of rows and columns in the channel matrix H representing channel states are determined according to the numbers of Rx and Tx antennas. Specifically, the number of rows in the channel matrix H is equal to the number of Rx antennas, $N_R$ and the number of columns in the channel matrix H is equal to the number of Tx antennas, $N_T$. Hence, the channel matrix H is an $N_R \times N_T$ matrix.

The rank of a matrix is defined as the smaller between the number of independent rows and the number of independent columns in the matrix. Accordingly, the rank of the matrix is not larger than the number of rows or columns of the matrix. The rank of the channel matrix H, rank(H) satisfies the following constraint.

$$\text{rank}(H) \leq \min(N_T, N_R) \qquad \text{[Equation 11]}$$

The rank of a matrix may also be defined as the number of non-zero eigenvalues, when the matrix is decomposed by EigenValue Decomposition (EVD). Similarly, the rank of a matrix may be defined as the number of non-zero singular values, when the matrix is decomposed by Singular Value Decomposition (SVD). Therefore, the rank of a channel matrix may be the maximum number of different pieces of information that can be transmitted on a physical channel, in its physical meaning.

Downlink Reference Signal (DL RS)

In a wireless communication system, data is transmitted on a radio channel. In view of the nature of the radio channel, a signal may be distorted during transmission. To receive a distorted signal accurately, a receiver should compensate for the distortion of the received signal using channel information. To enable the receiver to acquire the channel information, a transmitter transmits a signal known to both the transmitter and the receiver and the receiver acquires knowledge of channel information based on the distortion degree of the signal received on the radio channel. This signal is called a pilot signal or an RS.

In the case of data transmission and reception through multiple antennas, knowledge of channel states between Tx antennas and Rx antennas is required for successful signal reception. Accordingly, an RS should exist for each Tx antenna.

DL RSs are categorized into Common RS (CRS) shared among all UEs and Dedicated RS (DRS) specific to a particular UE. These RSs may deliver information for channel estimation and demodulation.

A receiver (i.e. a UE) feeds back a channel quality-related indicator such as a CQI, a PMI, and/or an RI to a transmitter (i.e. an eNB) by measuring channel states using CRSs. The CRS is also called a cell-specific RS. An RS related to feedback of Channel State Information (CSI) such as a CQI/PMI/RI may be separately defined as a CSI-RS.

A DRS may be transmitted in REs, when data transmitted on a PDSCH needs to be demodulated. A higher layer may notify a UE whether a DRS exists. Only when a related PDSCH is mapped, the DRS is valid. The DRS is also called a UE-specific RS or Demodulation Reference Signal (DMRS).

FIG. 8 illustrates patterns in which RSs are mapped to a DL RB pair, as defined in the 3GPP LTE system. An RS mapping unit, i.e. a DL RB pair may include one subframe in time by 12 subcarriers in frequency. That is, an RB pair includes 14 OFDM symbols in time in the case of normal CP (see FIG. 8(a)) and 12 OFDM symbols in time in the case of extended CP (see FIG. 8(b)). In an RB grid, REs labeled with '0', '1', '2' and '3' denote the positions of CRSs for first to fourth antenna ports, antenna port 0 to antenna port 3, respectively, and REs labeled with 'D' denote the positions of DRSs.

The CRS will first be described below in detail. CRSs are used for estimating channels of physical antennas. The CRSs are common to all UEs within a cell, distributed across a total frequency band. The CRSs may also serve the purpose of CSI acquisition and data demodulation.

CRSs are configured in various formats depending on the antenna configuration of a transmitter (i.e. an eNB). The 3GPP LTE system (e.g. conforming to Release-8) supports a variety of antenna configurations and DL transmitters have three antenna configurations, 1-Tx, 2-Tx and 4-Tx. In 1-Tx transmission, an eNB allocates an RS for a single antenna port. In 2-Tx transmission, the eNB allocates RSs for two antenna ports in Time Division Multiplexing (TDM) and/or Frequency Division Multiplexing (FDM). That is, RSs for two antenna ports are allocated to different time resources and/or different frequency resources and thus distinguished from each other by time and/or frequency. In 4-Tx transmission, the eNB allocates RSs for four antenna ports in TDM and/or FDM. Channel information that a DL receiver (i.e. a UE) measures may be used for demodulation of data transmitted in a transmission scheme such as single antenna transmission, transmit diversity, closed-loop spatial multiplexing, open-loop spatial multiplexing, Multi-User MIMO (MU-MIMO), etc.

When multiple antennas are supported, an antenna port transmits an RS in predetermined REs according to an RS pattern, while transmitting no signal in REs designated for the other antenna ports. That is, RSs are not overlapped between different antennas.

CRSs are mapped to an RB according to the following rule described as $$k = 6m + (v + v_{shift}) \bmod 6 \quad \text{[Equation 12]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In [Equation 12], k denotes a subcarrier index, l denotes a symbol index, p denotes an antenna port index, $N_{symb}^{DL}$ denotes the number of OFDM symbols in a DL slot, $N_{RB}^{DL}$ denotes the number of allocated DL RBs, $n_s$ denotes a slot index, $N_{ID}^{cell}$ denotes a cell ID, and mod represents a modulo operation. The positions of RSs in the frequency domain depend on the value of $v_{shift}$ and $v_{shift}$ in turn depends on the cell ID. Therefore, the positions of RSs have different frequency shift values in different cells.

Specifically, to increase channel estimation performance using CRSs, the positions of CRSs of each cell may be shifted specifically to the cell along the frequency axis. For example, when RSs are positioned with a spacing of 3 subcarriers, one cell may allocate RSs to subcarrier $3k$, whereas another cell may allocate RSs to subcarrier ($3k+1$). From the perspective of one antenna port, RSs are arranged with a spacing of 6 REs in the frequency domain, 3 REs apart from an RE to which an RS is allocated for another antenna port.

In the time domain, RSs are arranged at a constant interval, starting from symbol 0 in each slot. The interval varies with a CP length. RSs are positioned in symbol 0 and symbol 4 of a slot in the case of normal CP, whereas RSs are positioned in symbol 0 and symbol 3 of a slot in the case of extended CP. An RS for an antenna port having a higher value between two antenna ports is defined in one OFDM symbol. Therefore, in 4-Tx transmission, RSs for antenna port 0 and antenna port 1 are positioned in symbol 0 and symbol 4 (in symbol 0 and symbol 3 in a subframe with an extended CP) and RSs for antenna port 2 and antenna port 3 are positioned in symbol 1 in a slot. One thing to note herein is that the frequency-domain positions of the RSs for antenna port 2 and antenna port 3 are exchanged in the second slot.

The DRS will be described below in greater detail. The DRS is used for data demodulation. A precoding weight for a specific UE in MIMO transmission is used without any change so that when receiving RSs, the UE may estimate a transmission channel transmitted through each Tx antenna, which is combined with the precoding weight.

The 3GPP LTE system (e.g., conforming to Release-8) supports up to 4 Tx antennas and defines a DRS for rank-1 beamforming. The DRS for rank-1 beamforming is an RS for antenna port 5.

DRSs are mapped to an RB according to the following rule. [Equation 13] is for the case of normal CP and [Equation 14] is for the case of extended CP.

$$k = (k') \bmod N_{sc}^{RB} + N_{sc}^{RB} \cdot n_{PRB} \quad \text{[Equation 13]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \quad \text{[Equation 14]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In [Equation 13] and [Equation 14], k denotes a subcarrier index, l denotes a symbol index, $N_{sc}^{RB}$ denotes an RB size in the frequency domain, expressed as the number of subcarriers, $n_{PRB}$ denotes the number of Physical RBs (PRBs), $N_{RB}^{PDSCH}$ denotes the frequency band of an RB for PDSCH transmission, $n_s$ denotes a slot index, $N_{ID}^{cell}$ denotes a cell ID, and mod represents a modulo operation. The positions of RSs in the frequency domain depend on the value of $v_{shift}$ and $v_{shift}$ in turn depends on the cell ID. Therefore, the positions of RSs have different frequency shift values in different cells.

Uplink Reference Signal (UL RS)

Like a DL, a UL needs an RS for channel estimation so that a receiver may demodulate different UL physical channels. UL RSs are categorized into DMRS for coherent demodulation of UL physical channels (PUSCH and PUCCH) and Sounding Reference Signal (SRS) for estimation of UL channel quality. A DMRS is transmitted always in the same frequency band along with a corresponding physical channel, whereas an SRS is not necessarily transmitted along with another physical channel.

Figure 9:
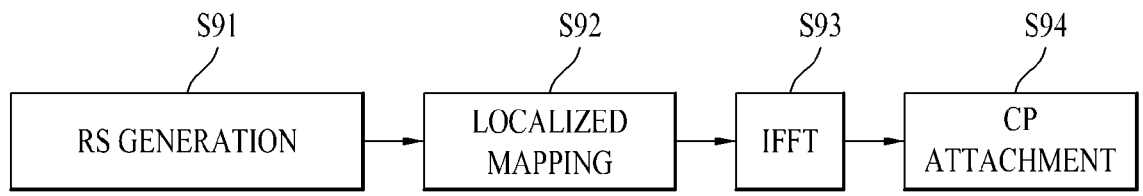
FIG. 9 is a block diagram illustrating a signal processing operation for transmitting an uplink RS.

FIG. 9 is a block diagram illustrating a signal processing operation for transmitting a UL RS.

Referring to FIG. 9, for data transmission, a signal is generated in the time domain, frequency-mapped through a Discrete Fourier Transform (DFT) precoder, and then transmitted by Inverse Fast Fourier Transform (IFFT). On the other hand, DFT precoding is not performed for an RS. Specifically, after a reference sequence is generated in the frequency domain (S91), it is subjected sequentially to localized mapping (S92), IFFT (S93), and CP attachment (S94) prior to transmission.

The SRS will be described in greater detail. The SRS is used mainly for channel quality measurement, for UL frequency-selective scheduling, with no relation to transmission of UL data and/or control information. However, the present is not limited thereto. The SRS may be used for many other purposes in order to improve power control or support various start-up functions of UEs that have not been scheduled recently. Examples of the start-up functions may include an initial Modulation and Coding Scheme (MCS), initial power control for data transmission, timing advance, and frequency semi-selective scheduling. Frequency semi-selective scheduling refers to a scheduling scheme in which frequency resources are selectively allocated to the first slot of a subframe and then hop to a different frequency pseudo-randomly in the second slot of the subframe.

Also, the SRS may be used to measure DL channel quality on the assumption that DL and UL radio channels are reciprocal. This assumption is valid particularly in a TDD system in which the UL and the DL share the same frequency spectrum and are separated in time.

Subframes carrying SRSs that a UE transmits in a cell may be indicated by a cell-specific broadcast signal. A 4-bit cell-specific parameter 'srsSubframeConfiguraiton' represents 15 available subframe configurations in which an SRS may be transmitted in each radio frame. These configurations provide flexibility to adjustment of SRS overhead according to a deployment scenario. Among the configurations, a $16^{th}$ configuration perfectly switches off the SRS in a cell. Thus the $16^{th}$ configuration is suitable for a serving cell that serves mainly fast UEs.

Figure 10:
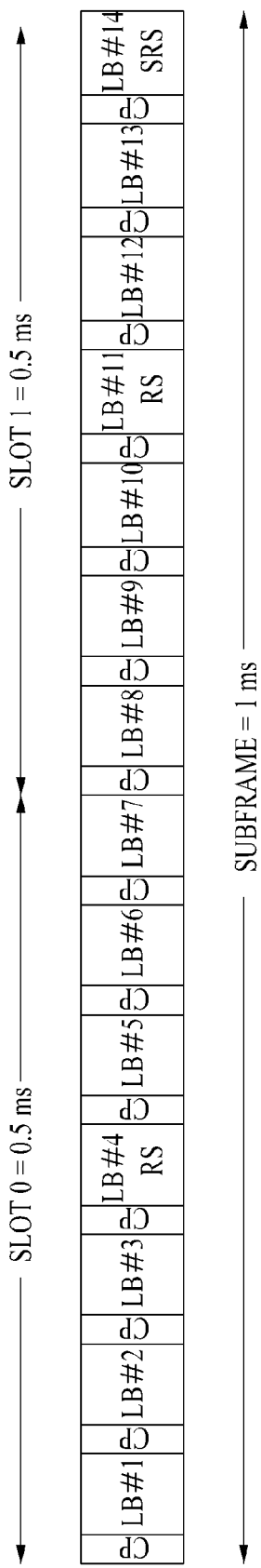
FIG. 10 illustrates an uplink subframe carrying a Sounding Resource Signal (SRS) symbol.

FIG. 10 illustrates a UL subframe carrying an SRS symbol.

Referring to FIG. 10, an SRS is transmitted always in the last SC-FDMA symbol of a configured subframe. Accordingly, an SRS and a DMRS are positioned in different SC-FDMA symbols. PUSCH data transmission is not allowed in a specific SC-FDMA symbol configured for SRS transmission. As a consequence, even though sounding overhead is highest, that is, every subframe carries an SRS symbol, the sounding overhead does not exceed about 7%.

Each SRS symbol is generated using a base sequence (a random sequence or a Zadoff-Chu (ZC) sequence) for a given time unit and frequency band and all UEs in the same cell use the same base sequence. SRSs that a plurality of UEs transmit at the same time in the same frequency band in the same cell are distinguished orthogonally by different cyclic shifts of the same base sequence. Although SRS sequences of different cells may be distinguished from one another by allocating a different base sequence to each cell, no orthogonality is ensured among different base sequences.

Hereinbelow, a detailed description will be given of an RS, particularly DMRS.

An RS sequence $r_{u,v}^{(\alpha)}(n)$ may be defined based on a base sequence $\bar{r}_{u,v}(n)$ and a cyclic shift $\alpha$ by [Equation 15].

$$r_{u,v}^{(\alpha)}(n)=e^{j\alpha n}\bar{r}_{u,v}(n), 0 \le n < M_{sc}^{RS}$$ [Equation 15]

In [Equation 15], $M_{sc}^{RS}$ ($1 \le m \le N_{RB}^{max,UL}$) denotes the length of the RS sequence, $M_{sc}^{RS}=mN_{sc}^{RB}$. $N_{sc}^{RB}$ denotes an RB size expressed as the number of subcarriers in the frequency domain and $N_{RB}^{max,UL}$ denotes a maximum UL bandwidth expressed as a multiple of $N_{sc}^{RB}$. A plurality of RS sequences may be defined by applying different cyclic shift values $\alpha$ to one base sequence.

Base sequences $\bar{r}_{u,v}(n)$ are grouped into a plurality of groups, where $u \in \{0,1,\ldots,29\}$ denotes a group index and v denotes a base sequence index in a group. A base sequence depends on its length $M_{sc}^{RS}$. Each group includes one base sequence (v=0) with length $M_{sc}^{RS}$ for m satisfying $1 \le m \le 5$ and two base sequences (v=0,1) with length $M_{sc}^{RS}$ for m satisfying $6 \le m \le N_{RB}^{max,UL}$. The sequence group index u and the base sequence index V in a group may vary with passage of time, as is the case with group hopping or sequence hopping which will be described later.

A base sequence with a length equal to or larger than $3N_{sc}^{RB}$ is defined by [Equation 16].

$$\bar{r}_{u,v}(n)=x_q(n \bmod N_{ZC}^{RS}), 0 \le n < M_{sc}^{RS}$$ [Equation 16]

In [Equation 16], q denotes the root index of a ZC sequence and $N_{ZC}^{RS}$ denotes the length of the ZC sequence, a largest prime number less than $M_{sc}^{RS}$. A ZC sequence with root index q may be defined by [Equation 17].

$$x_q(m) = e^{-j\frac{\pi qm(m+1)}{N_{ZC}^{RS}}}, 0 \le m \le N_{ZC}^{RS}-1$$ [Equation 17]

q may also be given as [Equation 18].

$$q=\lfloor \bar{q}+1/2 \rfloor + v \cdot (-1)^{\lfloor 2\bar{q} \rfloor}$$

$$\bar{q}=N_{ZC}^{RS} \cdot (u+1)/31$$ [Equation 18]

If the length of an RS sequence is equal to or less than $3N_{sc}^{RB}$, a base sequence is defined by [Equation 19].

$$\bar{r}_{u,v}(n)=e^{j\phi(n)\pi/4}, 0 \le n \le M_{sc}^{RS}-1$$ [Equation 19]

[Table 1] and [Table 2] below illustrate exemplary values of $\phi(n)$ for $M_{sc}^{RS}=N_{sc}^{RB}$ and $M_{sc}^{RS}=2N_{sc}^{RB}$, respectively.

TABLE 1

| u | $\phi(0), \ldots, \phi(11)$ | | | | | | | | | | | |
|---|---|---|---|---|---|---|---|---|---|---|---|---|
| 0 | -1 | 1 | 3 | -3 | 3 | 3 | 1 | 1 | 3 | 1 | -3 | 3 |
| 1 | 1 | 1 | 3 | 3 | 3 | -1 | 1 | -3 | -3 | 1 | -3 | 3 |
| 2 | 1 | 1 | -3 | -3 | -3 | -1 | -3 | -3 | 1 | -3 | 1 | -1 |
| 3 | -1 | 1 | 1 | 1 | 1 | -1 | -3 | -3 | 1 | -3 | 3 | -1 |
| 4 | -1 | 3 | 1 | -1 | 1 | -1 | -3 | -1 | 1 | -1 | 1 | 3 |
| 5 | 1 | -3 | 3 | -1 | -1 | 1 | 1 | -1 | -1 | 3 | -3 | 1 |
| 6 | -1 | 3 | -3 | -3 | -3 | 3 | 1 | -1 | 3 | 3 | -3 | 1 |
| 7 | -3 | -1 | -1 | -1 | 1 | -3 | 3 | -1 | 1 | -3 | 3 | 1 |
| 8 | 1 | -3 | 3 | 1 | -1 | -1 | -1 | 1 | 1 | 3 | -1 | 1 |
| 9 | 1 | -3 | -1 | 3 | 3 | -1 | -3 | 1 | 1 | 1 | 1 | 1 |
| 10 | -1 | 3 | -1 | 1 | 1 | -3 | -3 | -1 | -3 | -3 | 3 | -1 |
| 11 | 3 | 1 | -1 | -1 | 3 | 3 | -3 | 1 | 3 | 1 | 3 | 3 |
| 12 | 1 | -3 | 1 | 1 | -3 | 1 | 1 | 1 | -3 | -3 | -3 | 1 |
| 13 | 3 | 3 | -3 | 3 | -3 | 1 | 1 | 3 | -1 | -3 | 3 | 3 |
| 14 | -3 | 1 | -1 | -3 | -1 | 3 | 1 | 3 | 3 | 3 | -1 | 1 |
| 15 | 3 | -1 | 1 | -3 | -1 | -1 | 1 | 1 | 3 | 1 | -1 | -3 |
| 16 | 1 | 3 | 1 | -1 | 1 | 3 | 3 | 3 | -1 | -1 | 3 | -1 |
| 17 | -3 | 1 | 1 | 3 | -3 | 3 | -3 | -3 | 3 | 1 | 3 | -1 |
| 18 | -3 | 3 | 1 | 1 | -3 | 1 | -3 | -3 | -1 | -1 | 1 | -3 |
| 19 | -1 | 3 | 1 | 3 | 1 | -1 | -1 | 3 | -3 | -1 | -3 | -1 |
| 20 | -1 | -3 | 1 | 1 | 1 | 1 | 3 | 1 | -1 | 1 | -3 | -1 |
| 21 | -1 | 3 | -1 | 1 | -3 | -3 | -3 | -3 | -3 | 1 | -1 | -3 |
| 22 | 1 | 1 | -3 | -3 | -3 | -3 | -1 | 3 | -3 | 1 | -3 | 3 |
| 23 | 1 | 1 | -1 | -3 | -1 | -3 | 1 | -1 | 1 | 3 | -1 | 1 |
| 24 | 1 | 1 | 3 | 1 | 3 | 3 | -1 | 1 | -1 | -3 | -3 | 1 |
| 25 | 1 | -3 | 3 | 3 | 1 | 3 | 3 | 1 | -3 | -1 | -1 | 3 |
| 26 | 1 | 3 | -3 | -3 | 3 | -3 | 1 | -1 | -1 | 3 | -1 | -3 |
| 27 | -3 | -1 | -3 | -1 | -3 | 3 | 1 | -1 | 1 | 3 | -3 | -3 |
| 28 | -1 | 3 | -3 | 3 | -1 | 3 | 3 | -3 | 3 | 3 | -1 | -1 |
| 29 | 3 | -3 | -3 | -1 | -1 | -3 | -1 | 3 | -3 | 3 | 1 | -1 |

TABLE 2

| u | $\phi(0), \ldots, \phi(23)$ | | | | | | | | | | | | | | | | | | | | | | | |
|---|---|---|---|---|---|---|---|---|---|---|---|---|---|---|---|---|---|---|---|---|---|---|---|---|
| 0 | -1 | 3 | 1 | -3 | 3 | -1 | 1 | 3 | -3 | 3 | 1 | 3 | -3 | 3 | 1 | 1 | -1 | 1 | 3 | -3 | 3 | -3 | -1 | -3 |
| 1 | -3 | 3 | -3 | -3 | -3 | 1 | -3 | -3 | 3 | -1 | 1 | 1 | 1 | 3 | 1 | -1 | 3 | -3 | 1 | 3 | 1 | 1 | -3 |
| 2 | 3 | -1 | 3 | 3 | 1 | 1 | -3 | 3 | 3 | 3 | 3 | 1 | -1 | 3 | -1 | 1 | 1 | -1 | -3 | -1 | -1 | 1 | 3 | 3 |
| 3 | -1 | -3 | 1 | 1 | 3 | -3 | 1 | 1 | -3 | -1 | -1 | 1 | 3 | 1 | 3 | 1 | -1 | 3 | 1 | 1 | -3 | -1 | -3 | -1 |
| 4 | -1 | -1 | -1 | -3 | -3 | -1 | 1 | 1 | 3 | 3 | -1 | 3 | -1 | 1 | -1 | -3 | 1 | -1 | -3 | -3 | 1 | -3 | -1 | -1 |
| 5 | -3 | 1 | 1 | 3 | -1 | 1 | 3 | 1 | -3 | 1 | 1 | -1 | -1 | 3 | -1 | -3 | 3 | -3 | -3 | -3 | -3 | 1 | 1 |
| 6 | 1 | 1 | -1 | -1 | 3 | -3 | -3 | 3 | -3 | 1 | -1 | -1 | 1 | 1 | -1 | 1 | -3 | -1 | 1 | -1 | 3 | -1 | -3 |
| 7 | -3 | 3 | 3 | -1 | -1 | -3 | -1 | 3 | 1 | 3 | 1 | 3 | 1 | 1 | -1 | 3 | 1 | -1 | 1 | 3 | -3 | -1 | -1 | 1 |
| 8 | -3 | 1 | 3 | -3 | 1 | -1 | -3 | 3 | -3 | 3 | -1 | -1 | -1 | -1 | 1 | -3 | -3 | -3 | 1 | -3 | -3 | -3 | 1 | -3 |
| 9 | 1 | 1 | -3 | 3 | 3 | -1 | -3 | -1 | 3 | -3 | 3 | 3 | 3 | -1 | 1 | 1 | -3 | 1 | -1 | 1 | 1 | -3 | 1 | 1 |
| 10 | -1 | 1 | -3 | -3 | 3 | -1 | 3 | -1 | -1 | -3 | -3 | -3 | -1 | -3 | -3 | 1 | -1 | 1 | 3 | 3 | -1 | 1 | -1 | 3 |
| 11 | 1 | 3 | 3 | -3 | -3 | 1 | 3 | 1 | -1 | -3 | -3 | -3 | 3 | 3 | -3 | 3 | 3 | -1 | -3 | 3 | -1 | 1 | -3 | 1 |
| 12 | 1 | 3 | 3 | 1 | 1 | 1 | -1 | -1 | 1 | -3 | 3 | -1 | 1 | 1 | -3 | 3 | 3 | -1 | -3 | 3 | -3 | -1 | -3 | -1 |
| 13 | 3 | -1 | -1 | -1 | -1 | -3 | -1 | 3 | 3 | 1 | -1 | 1 | 3 | 3 | 3 | -1 | 1 | 1 | -3 | 1 | 3 | -1 | -3 | 3 |
| 14 | -3 | -3 | 3 | 1 | 3 | 1 | -3 | 3 | 1 | 3 | 1 | 1 | 3 | 3 | -1 | -3 | 1 | -3 | -1 | 3 | 1 | 1 | 3 |
| 15 | -1 | -1 | 1 | -3 | 1 | 3 | -3 | 1 | -1 | -3 | -1 | 3 | 1 | 3 | 1 | -1 | -3 | -3 | -1 | -1 | -3 | -3 | -3 | -1 |
| 16 | -1 | -3 | 3 | -1 | -1 | -1 | -1 | 1 | 1 | -3 | 3 | 1 | 3 | 3 | 1 | -1 | 1 | -3 | 1 | -3 | 1 | 1 | -3 | -1 |
| 17 | 1 | 3 | -1 | 3 | 3 | -1 | -3 | 1 | -1 | -3 | 3 | 3 | 3 | -1 | 1 | 1 | 3 | -1 | -3 | -1 | 3 | -1 | -1 | -1 |
| 18 | 1 | 1 | 1 | 1 | 1 | -1 | 3 | -1 | -3 | 1 | 1 | 3 | -3 | 1 | -3 | -1 | 1 | 1 | -3 | -3 | 3 | 1 | 1 | -3 |
| 19 | 1 | 3 | 3 | 1 | -1 | -3 | 3 | -1 | 3 | 3 | 3 | -3 | 1 | -1 | 1 | -1 | -3 | -1 | 1 | 3 | -1 | 3 | -3 | -3 |
| 20 | -1 | -3 | 3 | -3 | -3 | -3 | -1 | -1 | -3 | -1 | -3 | 3 | 1 | 3 | -3 | -1 | 3 | -1 | 1 | -1 | 3 | -3 | 1 | -1 |
| 21 | -3 | -3 | 1 | 1 | -1 | 1 | -1 | 1 | -1 | 3 | 1 | -3 | -1 | 1 | -1 | 1 | -1 | -1 | 3 | 3 | -3 | -1 | 1 | -3 |
| 22 | -3 | -1 | -3 | 3 | 1 | -1 | -3 | -1 | -3 | -3 | 3 | -3 | 3 | -3 | -1 | 1 | 3 | 1 | -3 | 1 | 3 | 3 | -1 | -3 |
| 23 | -1 | -1 | -1 | -1 | 3 | 3 | 3 | 1 | 3 | 3 | -3 | 1 | 3 | -1 | 3 | -1 | 3 | 3 | -3 | 3 | 1 | -1 | 3 | 3 |
| 24 | 1 | -1 | 3 | 3 | -1 | -3 | 3 | -3 | -1 | -1 | 3 | -1 | 3 | -1 | -1 | 1 | 1 | 1 | 1 | -1 | -1 | -3 | -1 | 3 |
| 25 | 1 | -1 | 1 | -1 | 3 | -1 | 3 | 1 | 1 | -1 | -1 | -3 | 1 | 1 | -3 | 1 | 3 | -3 | 1 | 1 | -3 | -3 | -1 | -1 |
| 26 | -3 | -1 | 1 | 3 | 1 | 1 | -3 | -1 | -1 | -3 | 3 | -3 | 3 | 1 | -3 | 3 | -3 | 1 | -1 | 1 | -3 | 1 | 1 | 1 |
| 27 | -1 | -3 | 3 | 3 | 1 | 1 | 3 | -1 | -3 | -1 | -1 | 3 | 1 | -3 | -3 | -1 | 3 | -3 | -1 | -3 | -1 | -3 | -1 |
| 28 | -1 | -3 | -1 | -1 | 1 | -3 | -1 | -1 | 1 | -1 | -3 | 1 | 1 | -3 | 1 | -3 | -3 | 3 | 1 | 1 | -1 | 3 | -1 | -1 |
| 29 | 1 | 1 | -1 | -1 | -3 | -1 | 3 | -1 | 3 | -1 | 1 | 3 | 1 | -1 | 3 | 1 | 3 | -3 | -3 | 1 | -1 | -1 | 1 | 3 |

RSs may hop in the following manner.

The sequence group index u of the slot index $n_s$ may be defined based on a group hopping pattern $f_{gh}(n_s)$ and a sequence shift pattern $f_{ss}$ by [Equation 20].

$$u=(f_{gh}(n_s)+f_{ss}) \bmod 30 \quad \text{[Equation 20]}$$

17 different group hopping patterns and 30 different sequence shift patterns may be available. Whether to enable or disable group hopping may be indicated by a higher layer.

A PUCCH and a PUSCH may have the same group hopping pattern. The group hopping pattern $f_{gh}(n_s)$ may be defined by [Equation 21].

$$f_{gh}(n_s) = \begin{cases} 0 & \text{if group hopping is disabled} \\ \left(\sum_{i=0}^{7} c(8n_s + i) \cdot 2^i\right) \bmod 30 & \text{if group hopping is enabled} \end{cases} \quad \text{[Equation 21]}$$

In [Equation 21], c(i) is a pseudo-random sequence being a Pseudo-random Noise (PN) sequence, which may be defined using a Gold sequence of length 31. [Equation 22] illustrates an example of a Gold sequence c(n).

$$c(n)=(x_1(n+N_c)+x_2(n+N_c)) \bmod 2$$

$$x_1(n+31)=(x_1(n+3)=x_1(n)) \bmod 2$$

$$x_2(n+31)=(x_2(n+3)+x_2(n+2)+x_1(n+1)+x_1(n)) \bmod 2 \quad \text{[Equation 22]}$$

In [Equation 22], Nc=1600, $x_1(i)$ is a first m-sequence, and $x_2(i)$ is a second m-sequence. For example, the first m-sequence or the second m-sequence may be initialized in each SC-FDMA symbol according to a cell ID, a slot number in a radio frame, an SC-FDMA symbol index in a slot, and a CP type. A pseudo-random sequence generator may be initialized to $$c_{init} = \left\lfloor \frac{N_{ID}^{cell}}{30} \right\rfloor$$

at the start of each radio frame.

A PUCCH and a PUSCH may have the same sequence shift pattern. The sequence shift pattern of the PUCCH may be given as $f_{ss}^{PUCCH}=N_{ID}^{cell} \bmod 30$ and the sequence shift pattern of the PUSCH may be given as $f_{ss}^{PUSCH}=(f_{ss}^{PUCCH}+\Delta_{ss}) \bmod 30$ $\Delta_{ss} \in \{0, 1, \ldots, 29\}$ may be set by a higher layer.

Only an RS sequence longer than $6N_{sc}^{RB}$ may be subject to sequence hopping. Herein, a base sequence index v in a base sequence group with a slot index $n_s$ may be defined by [Equation 23].

$$v = \begin{cases} c(n_s) & \text{if group hopping is disabled} \\ & \text{and sequence hopping is enabled} \\ 0 & \text{otherwise} \end{cases} \quad \text{[Equation 23]}$$

c(i) may be represented by the example of [Equation 22] and whether to enable or disable sequence hopping may be indicated by a higher layer. The pseudo-random sequence generator may be initialized to $$c_{init} = \left\lfloor \frac{N_{ID}^{cell}}{30} \right\rfloor \cdot 2^5 + f_{ss}^{PUSCH}$$

at the start of each radio frame.

A DMRS sequence for a PUSCH is determined as follows.

An RS sequence $r_{PUSCH}^{(\lambda)}(\cdot)$ for the PUSCH corresponds to a layer index $\lambda \in \{0, 1, \ldots, \upsilon-1\}$, defined by [Equation 24].

$$r_{PUSCH}^{(\lambda)}(m \cdot M_{sc}^{RS}+n)=w^{(\lambda)}(m)r_{u,v}^{(\alpha_\lambda)}(n) \quad \text{[Equation 24]}$$

m=0,1

In [Equation 24], m and n satisfy n=0, ..., $M_{sc}^{RS}-1$ where $M_{sc}^{RS}=M_{sc}^{PUSCH}$.

If a higher-layer parameter 'Activate-DMRS-with OCC' is not set or a temporary C-RNTI is used to transmit the latest UL-related DCI, an orthogonal sequence $w^{(\lambda)}(m)$ is set to $[w^\lambda(0)\ w^\lambda(1)]=[1\ 1]$ for DCI format 0. On the other hand, $w^{(\lambda)}(m)$ may be set as illustrated in [Table 3] below according to a cyclic shift field included in the latest UL-related DCI for a Transport Block (TB) related to a corresponding PUSCH transmission.

$[w^{(\lambda)}(0)\ w^{(\lambda)}(1)]$ represents an orthogonal sequence corresponding to a layer index $\lambda$. Specifically, $w^{(\lambda)}(0)$ is a value applied to a first slot with the layer index $\lambda$ and $w^{(\lambda)}(1)$ is a value applied to a second slot with the layer index $\lambda$.

[Table 3] illustrates a mapping relationship among a cyclic shift field, $n_{DMRS,\lambda}^{(2)}$, and $[w^{(\lambda)}(0)\ w^{(\lambda)}(1)]$ in UL-related DCI.

TABLE 3

| Cyclic Shift Field in uplink-related DCI format [3] | $n_{DMRS,\lambda}^{(2)}$ | | | | $[w^{(\lambda)}_{(0)}\ w^{(\lambda)}_{(1)}]$ | | | |
|---|---|---|---|---|---|---|---|---|
| | $\lambda=0$ | $\lambda=1$ | $\lambda=2$ | $\lambda=3$ | $\lambda=0$ | $\lambda=1$ | $\lambda=2$ | $\lambda=3$ |
| 000 | 0 | 6 | 3 | 9 | [1 1] | [1 1] | [1 -1] | [1 -1] |
| 001 | 6 | 0 | 9 | 3 | [1 -1] | [1 -1] | [1 1] | [1 1] |
| 010 | 3 | 9 | 6 | 0 | [1 -1] | [1 -1] | [1 1] | [1 1] |
| 011 | 4 | 10 | 7 | 1 | [1 1] | [1 1] | [1 1] | [1 1] |
| 100 | 2 | 8 | 5 | 11 | [1 1] | [1 1] | [1 1] | [1 1] |
| 101 | 8 | 2 | 11 | 5 | [1 -1] | [1 -1] | [1 -1] | [1 -1] |
| 110 | 10 | 4 | 1 | 7 | [1 -1] | [1 -1] | [1 -1] | [1 -1] |
| 111 | 9 | 3 | 0 | 6 | [1 1] | [1 1] | [1 -1] | [1 -1] |

A cyclic shift value $\alpha_\lambda$ and $n_{cs,\lambda}$ in slot $n_s$ may be defined respectively by [Equation 25] and [Equation 26].

$$\alpha_\lambda = 2\pi n_{cs,\lambda}/12 \quad \text{[Equation 25]}$$

$$n_{cs,\lambda} = (n_{DMRS}^{(1)} + n_{DMRS,\lambda}^{(2)} + n_{PN}(n_s)) \bmod 12 \quad \text{[Equation 26]}$$

$n_{DMRS}^{(1)}$ is indicated by a higher-layer parameter 'cyclic-Shift' and [Table 4] illustrates a mapping relationship between values of the parameter 'cyclicShift' and $n_{DMRS}^{(1)}$.

TABLE 4

| cyclicShift | $n_{DMRS}^{(1)}$ |
|---|---|
| 0 | 0 |
| 1 | 2 |
| 2 | 3 |
| 3 | 4 |
| 4 | 6 |
| 5 | 8 |
| 6 | 9 |
| 7 | 10 |

$n_{DMRS,\lambda}^{(2)}$ is determined by a cyclic shift value for a DMRS field in the latest UL-related DCI for a TB corresponding to PUSCH transmission. The values of $n_{DMRS,\lambda}^{(2)}$ are listed in [Table 3].

Referring to [Table 3], if a PDCCH including UL-related DCI is not transmitted in the same RB, if an initial PUSCH is scheduled semi-persistently in the same TB, or if an initial PUSCH is scheduled by a random access response grant in the same TB, the values listed in the first column of [Table 3] may be used.

If there is no UL-related DCI for the same RB, if an initial PUSCH for the same TB is scheduled semi-statically, or if an initial PUSCH is scheduled by a random access response, [Table 3] may be used to acquire $n_{DMRS,0}^{(2)}$ and $w^{(\lambda)}(m)$.

$n_{PN}(n_s)$ may be defined by [Equation 27].

$$n_{PN}(n_s) = \Sigma_{i=0}^{7} c(8N_{symb}^{UL} \cdot n_s + i) \cdot 2^i \quad \text{[Equation 27]}$$

$c(i)$ may be represented by the example of [Equation 22] and the pseudo-random sequence generator may be initialized to $$c_{init} = \left\lfloor \frac{N_{ID}^{cell}}{30} \right\rfloor \cdot 2^5 + f_{ss}^{PUSCH}$$

at the start of each radio frame.

An RS vector may be precoded according to [Equation 28].

$$\begin{bmatrix} \tilde{r}_{PUSCH}^{(0)} \\ \vdots \\ \tilde{r}_{PUSCH}^{(P-1)} \end{bmatrix} = W \begin{bmatrix} r_{PUSCH}^{(0)} \\ \vdots \\ r_{PUSCH}^{(\upsilon-1)} \end{bmatrix} \quad \text{[Equation 28]}$$

In [Equation 28], P denotes the number of antenna ports used for PUSCH transmission. If a PUSCH is transmitted through one antenna port, P=1, W=1, and $\upsilon$=1. In spatial multiplexing, P=2 or P=4. The same precoding matrix W may be used for PUSCH precoding in the same subframe.

A UL RS may be mapped physically to a PUSCH in the following manner.

For each antenna port used for PUSCH transmission, a sequence $\tilde{r}_{PUSCH}^{(\tilde{p})}(\bullet)$ is multiplied by an amplitude scaling factor $\beta_{PUSCH}$ and mapped, starting with $\tilde{r}_{PUSCH}^{(\tilde{p})}(0)$. A relationship among a set of PRBs, an index $\tilde{p}$, and an antenna port number p which are used in a mapping process is the same as in corresponding PUSCH transmission. An RS sequence is mapped to (k, l) REs in an ascending order of k with l=3 for a normal CP and with l=2 for an extended CP, and then in an ascending order of slot numbers.

FIG. 11 illustrates structures of a subframe carrying a DMRS.

FIG. 11(a) illustrates the structure of a subframe carrying a DMRS in the case of normal CP and FIG. 11(b) illustrates the structure of a subframe carrying a DMRS in the case of extended CP. Referring to FIG. 11(a), DRMSs are transmitted in $4^{th}$ and $11^{th}$ SC-TDMA symbols in the case of normal CP. Referring to FIG. 11(b), DRMSs are transmitted in $3^{rd}$ and $9^{th}$ SC-FDMA symbols in the case of extended CP.

Improved TTI Bundling Method

The legacy LTE system (e.g., conforming to Release-8/9/10) adopts TTI bundling to extend the coverage of PUSCH VoIP. TTI bundling refers to transmission of a packet repeatedly in as many TTIs as a bundling size (e.g. 4).

FIG. 12 is a view comparing TTI bundling with non-TTI bundling in terms of redundancy.

FIG. 12(a) illustrates non-bundling and FIG. 12(b) illustrates 4-TTI bundling. One Radio Link Control (RLC) header and one Medium Access Control (MAC) header are transmitted per TTI in the non-bundling case, whereas one RLC header and one MAC header are transmitted during 4 TTIs in the TTI bundling case, thus reducing the numbers of RLC headers and MAC headers. That is, TTI bundling may bring about the effect of redundancy reduction. Compared to non-bundling, 4-TTI bundling reduces overhead by 120 bits, that is, 7.6%.

In a UL HARQ process of an existing FDD system, if a UE transmits data in SubFrame (SF) n, the UE receives a PHICH ACK/NACK (A/N) from an eNB in SF (n+4). Upon receipt of the NACK, the UE retransmits the data in SF (n+8) to the eNB. In the case of 4-TTI bundling, SF n, SF (n+1), SF (n+2), and SF (n+3) form one bundling packet. Thus, the eNB transmits an A/N after at least 4 subframes from reception of the last subframe SF (n+3) and the UE retransmits data after at least another 4 subframes. To set an HARQ period to a multiple of a conventional HARQ period, 8, retransmission occurs in SF (n+16) in TTI bundling. Accordingly, a retransmission period for one 4-TTI bundling is 16 TTIs. This implies that up to 3 retransmissions of TTI bundling are allocated to satisfy a strict VoIP latency constraint of 50 ms in the air interface or 4 retransmissions of TTI bundling are allocated to satisfy a rather mitigated VoIP latency constraint of 52 ms in the air interface. In addition, a rate at which a VoIP packet arrives at a physical layer from a higher layer is considered to be 20 ms.

In general, a VoIP packet is allocated to resources by Semi-Persistent Scheduling (SPS) and transmitted with a predetermined periodicity in a specific PRB or in a specific hopping pattern (e.g. when PUSCH hopping is triggered). Once the position of the transmitted PRB is determined through a PDCCH, the PRB lasts for the same SPS period as the same frequency resources until before it is determined again. Accordingly, if TTI bundling is used in SPS, an HARQ retransmission of a previously transmitted packet may collide with a new packet, which will be described with reference to FIG. 13.

Figure 13:
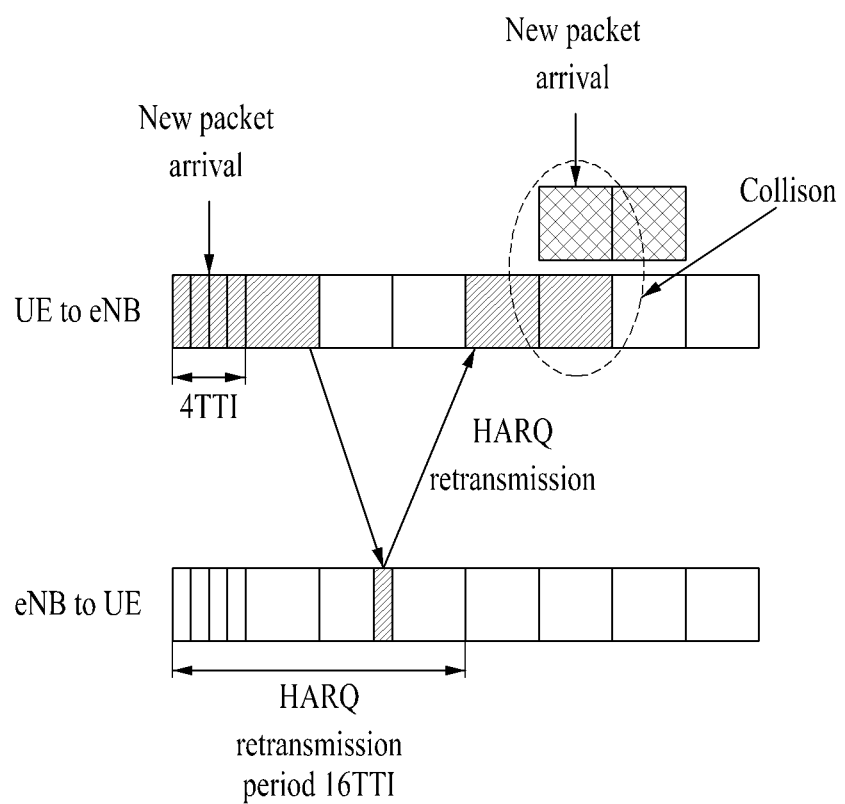
FIG. 13 illustrates collision between a new packet and a Hybrid Automatic Repeat and reQuest (HARQ) retransmission in 8-TTI bundling.

FIG. 13 illustrates collision between a new packet and an HARQ retransmission in 8-TTI bundling.

Referring to FIG. 13, since 8 TTIs are bundled to transmit one VoIP packet, an eNB transmits an A/N signal after at least 4 TTIs from reception of a last subframe of 8-TTI bundling. Upon receipt of the A/N, a UE performs an HARQ retransmission at least 4 TTIs later. Although another 8 TTIs are required to retransmit the VoIP packet, a new VoIP packet arrives at an interval of 20 ms and thus the HARQ retransmission packet collides with the new VoIP packet. That is, if 8-TTI bundles are consecutively allocated, an HARQ retransmission with a period of 16 ms may collide with a new VoIP packet with a period of 20 ms. Accordingly, there is a need for a design that prevents collision between an HARQ retransmission and a new VoIP packet in order to increase a TTI bundling size to 4 or larger.

Before describing a technique of the present invention, conventional 4-TTI bundling and a conventional HARQ process will first be described below with reference to FIG. 14.

Figure 14:
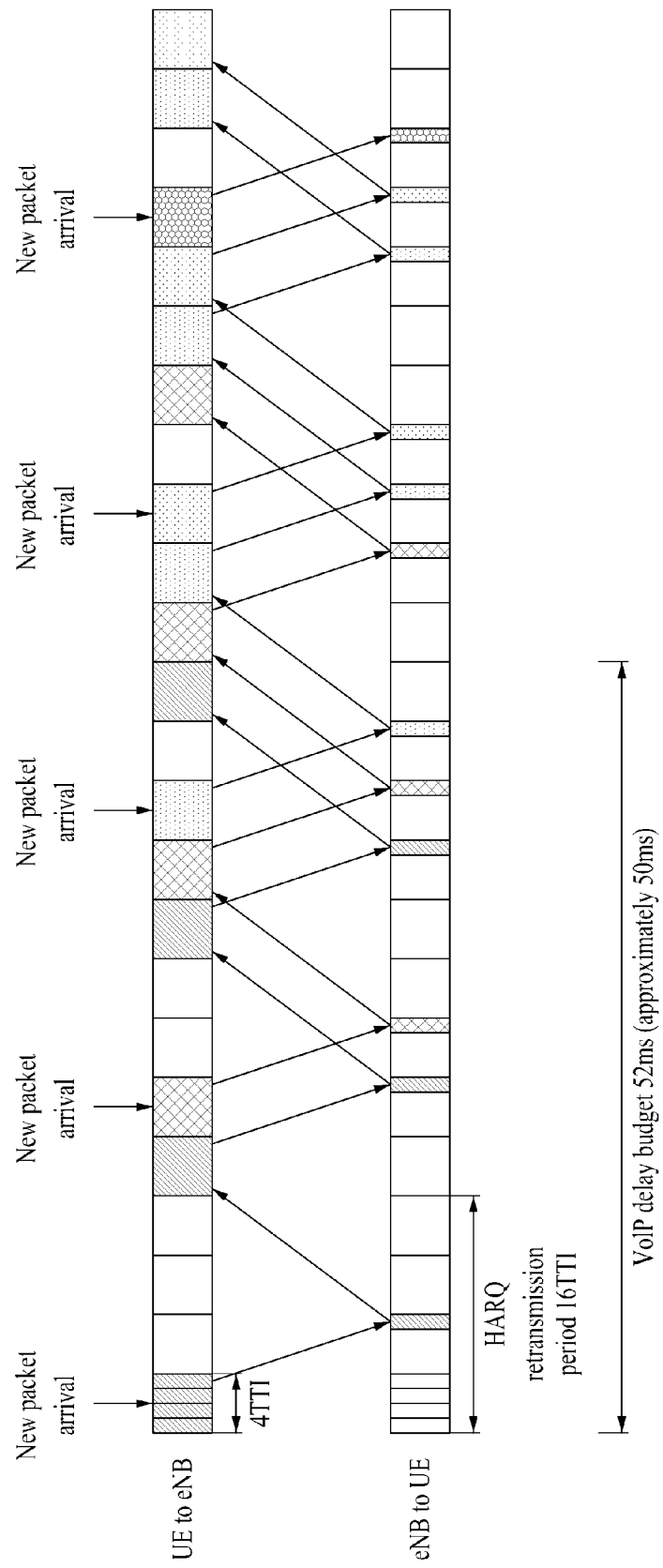
FIG. 14 illustrates 4-TTI bundling with 3 retransmissions.

FIG. 14 illustrates a 4-TTI bundling operation with 3 retransmissions.

Referring to FIG. 14, since 4 TTIs form one bundled packet (a first packet) as described before, an eNB transmits an A/N signal after at least 4 TTIs from reception of a last subframe of the bundled TTIs. Upon receipt of a NACK signal from the eNB, a UE retransmits the packet after 8 TTIs from reception of a subframe carrying the A/N signal. Eventually, one retransmission period is 16 ms. Accordingly, if the latency constraint is 52 ms, 4 retransmissions may occur at a period of 16 ms. One thing to note herein is that a new VoIP packet (a second packet) is transmitted 20 ms after the previous packet (the first packet), a retransmission packet (the first packet) does not collide with the new VoIP packet (the second packet). Also, another new VoIP packet (a third packet) is transmitted 20 ms after the previous packet (the second packet) and thus the retransmission packets (the first and second packets) do not collide with the new VoIP packet (the third packet). Consequently, no retransmission subframe overlaps with arrival of a new packet during 4 retransmissions in 4-TTI bundling.

Because one VoIP packet is transmitted in 4 4-TTI bundles, it occupies up to 16 TTIs within 52 ms. In other words, 4 TTIs are not reserved all the time for a new VoIP packet that arrives every 20 ms. If the delay budget is strictly constrained to 50 ms, one VoIP packet occupies 12 TTIs. This means that 8 subframes are empty without being reserved for a new VoIP packet or a retransmission packet. The present invention proposes a technique for transmitting a VoIP packet using such unused subframes.

Embodiment 1

An embodiment of the present invention is based on the assumption that a VoIP packet arrival rate is 20 ms, that is, a maximum number of collected TTIs per VoIP packet is 20.

As described before, 4 subframes following arrival of a new packet are not reserved for an HARQ retransmission or a new VoIP packet (see FIG. 14). A UE may automatically perform an HARQ retransmission in the 4 non-reserved subframes without receiving a PHICH from an eNB in order to extend coverage. This will be described below with reference to FIG. 15.

Figure 15:
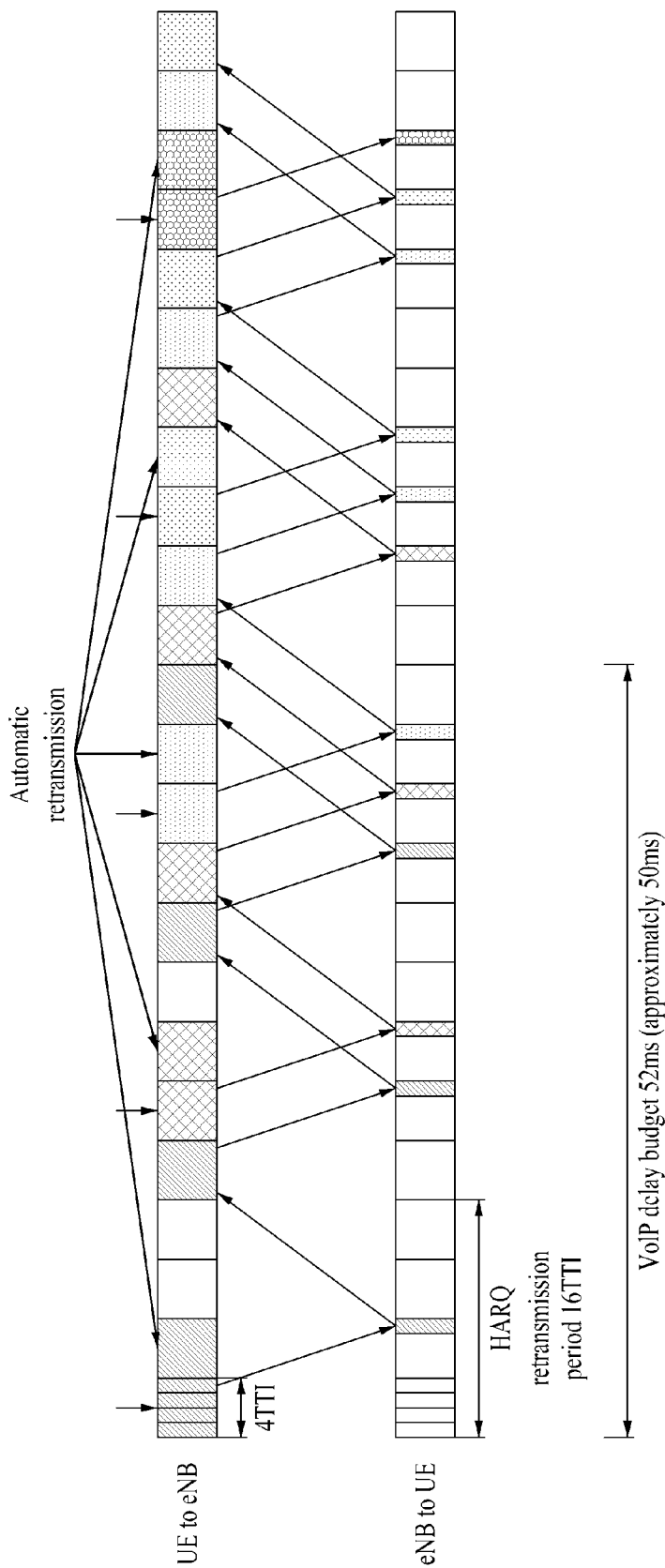
FIGS. 15 to 19 illustrate improved ITT bundling operations according to an embodiment of the present invention.

FIG. 15 illustrates an improved TTI bundling operation according to an embodiment of the present invention. In FIG. 15, a 52-ms delay budget is assumed.

Referring to FIG. 15, a UE automatically performs an HARQ retransmission only in 4 TTIs following an initial transmission of a new VoIP packet without receiving a PHICH from an eNB, while maintaining all HARQ processes of conventional 4-TTI bundling. The eNB receives only the first 4 subframes of a first 8 bundled TTIs for the new VoIP packet and then transmits a PHICH. The eNB transmits an A/N signal to the UE after at least 4 TTIs from reception of the last of the first 4 subframes. Upon receipt of a NACK signal from the eNB, the UE performs an HARQ retransmission after 8 TTIs from a subframe carrying the A/N signal. As is done conventionally, the UE does not perform an automatic retransmission in 4 TTIs following the 4 subframes in which the HARQ retransmission is performed. Since the conventional HARQ retransmission operation is still maintained as described above, a PHICH is transmitted at a period of 16 TTIs as is done in the conventional 4-TTI bundling. Herein, the UE may notify the eNB whether it will perform an automatic retransmission operation in an empty subframe. The eNB may receive a CQI from the UE and indicate to the UE whether TTI bundling is enabled or disable and a TTI bundling size, while triggering SPS. The eNB may indicate to the UE whether the UE will perform the automatic retransmission using a higher-layer parameter TTI_BUNDLE_SIZE indicating a TTI bundling size. That is, the UE may determine whether to perform the automatic retransmission based on the parameter TTI_BUNDLE_SIZE. For example, if TTI_BUNDLE_SIZE is set to 4, the UE may perform the conventional 4-TTI bundling operation. If TTI_BUNDLE_SIZE is set to 5 or larger, the UE may perform an improved TTI-bundling operation including the afore-described automatic retransmission operation.

In the example of FIG. 15, while the UE initially transmits a new VoIP packet in 8 bundled TTIs, the eNB transmits a PHICH by receiving only the first 4 TTIs. In this case, even when the eNB determines a NACK (i.e. decoding failure) upon receipt of the first 4 TTIs but determines an ACK (i.e. decoding success) by receiving an automatic retransmission, the eNB transmits a PHICH by receiving only the first TTIs. Therefore, an unnecessary HARQ retransmission may occur. Accordingly, in order to prevent unnecessary HARQ retransmissions, a method for transmitting a PHICH after receiving all of 8 bundled TTIs carrying an initially transmitted VoIP packet by an eNB may be considered. This will be described below with reference to FIG. 16.

Figure 16:
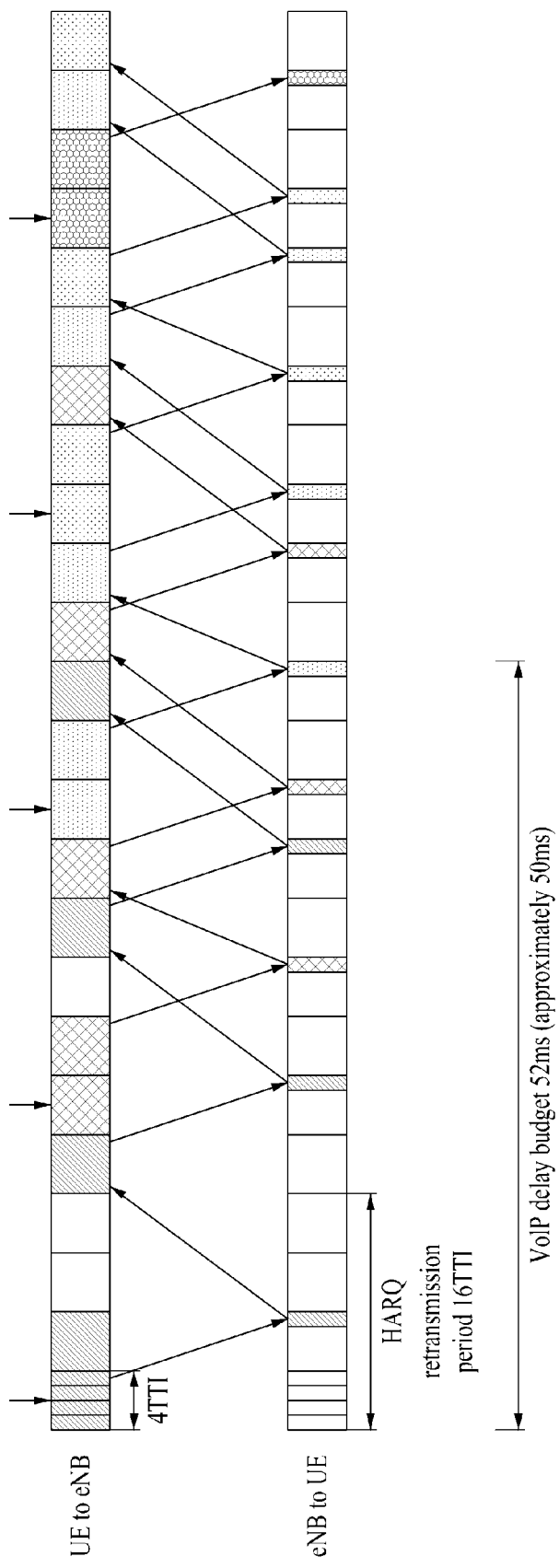

FIG. 16 illustrates an improved TTI bundling operation according to an embodiment of the present invention. In FIG. 16, a 52-ms delay budget is assumed.

Referring to FIG. 16, a UE transmits only an initial transmission VoIP packet in an 8-TTI bundle and then performs a packet retransmission in a 4-TTI bundle. Unlike the example of FIG. 15, the UE does not perform an automatic retransmission and an eNB transmits a PHICH to the UE after receiving all of the 8 bundled TTIs carrying the initial transmission VoIP packet from the UE. Accordingly, a PHICH period is 12 TTIs between first and second PHICHs and changed to 16 TTIs between the second and third PHICHs. The PHICH period change may be set by a physical layer signal or a higher-layer signal. Or it may be agreed in advance between the UE and the eNB that if a TTI bundling size (e.g. a value of TTI_BINDLE_SIZE) is set to 5 or larger, they operate with a changed PHICH period.

While the examples of FIGS. 15 and 16 are based on the assumption of a 52-ms delay budget, only 3 retransmissions are available in 4-TTI bundling if the delay budget is 50 ms. Therefore, since 8 TTIs following an initial transmission of a VoIP packet are not reserved, an up to 12 TTI bundle size is available for the initial VoIP packet transmission. This will be described with reference to FIG. 17.

Figure 17:
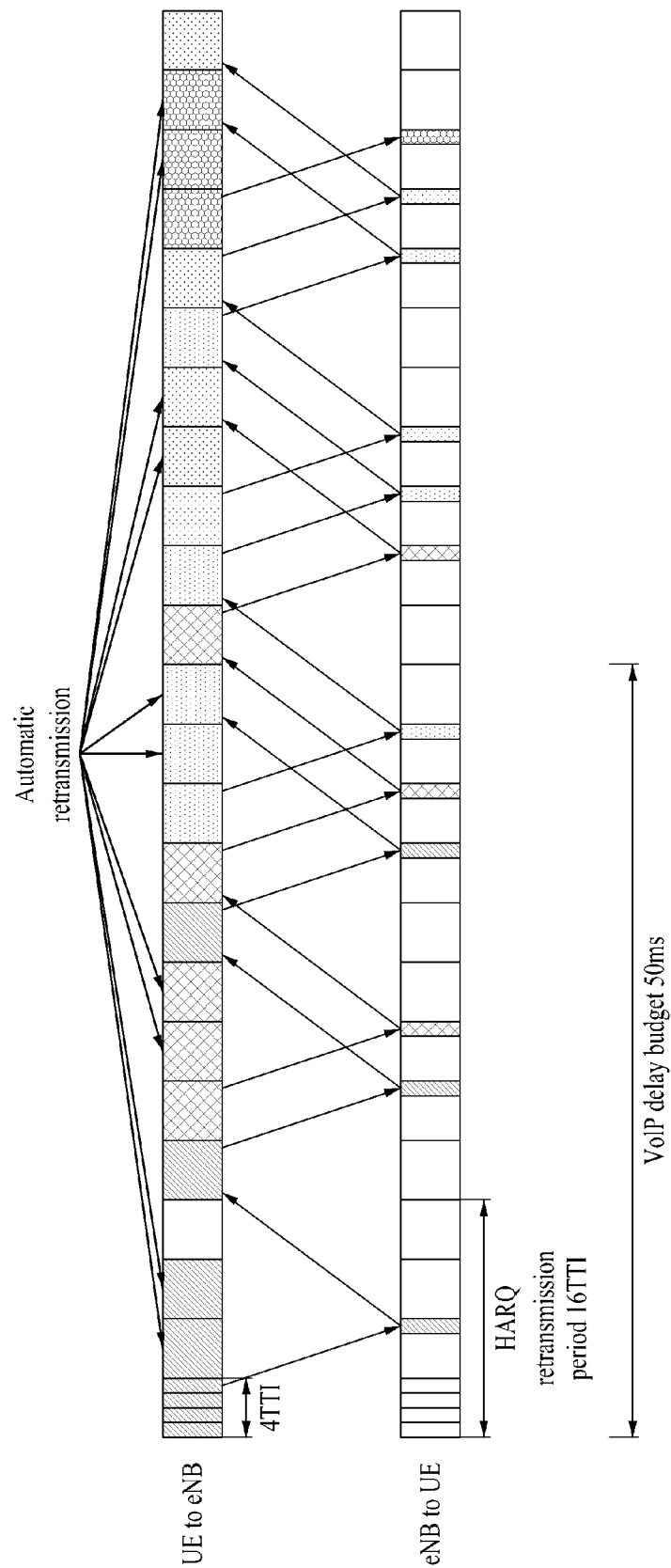

FIG. 17 illustrates an improved TTI bundling operation according to an embodiment of the present invention. In FIG. 17, it is assumed that the delay budget is 50 ms.

Referring to FIG. 17, while all HARQ processes of the conventional TTI bundling are maintained, an automatic retransmission is performed only in 4 TTIs (one automatic retransmission) or 8 TTIs (two automatic retransmissions) following an initial transmission of a new VoIP packet, without PHICH reception. An eNB may indicate to a UE whether the UE is supposed to perform an automatic retransmission in the 4 or 8 TTIs following the initial VoIP packet transmission by TTI_BUNDLE_SIZE. In the example of FIG. 17, 2 HARQ retransmissions and 2 automatic retransmissions take place in the improved TTI bundling operation.

As in the example of FIG. 15, while the UE initially transmits a new VoIP packet in a bundle of 12 TTIs, the eNB transmits a PHICH to the UE by receiving only the first 4 TTIs in the example of FIG. 17. In this case, even when the eNB determines a NACK (i.e. decoding failure) upon receipt of the first 4 TTIs and then determines an ACK (i.e. decoding success) by receiving an automatic retransmission, the eNB transmits a PHICH just by receiving only the first 4 TTIs. As a result, an unnecessary HARQ retransmission may occur. Accordingly, to prevent unnecessary HARQ retransmissions, a method for transmitting a PHICH after further receiving 4 TTIs by an eNB in the case of an initial VoIP packet transmission may be considered. This will be described below with reference to FIG. 18.

Figure 18:
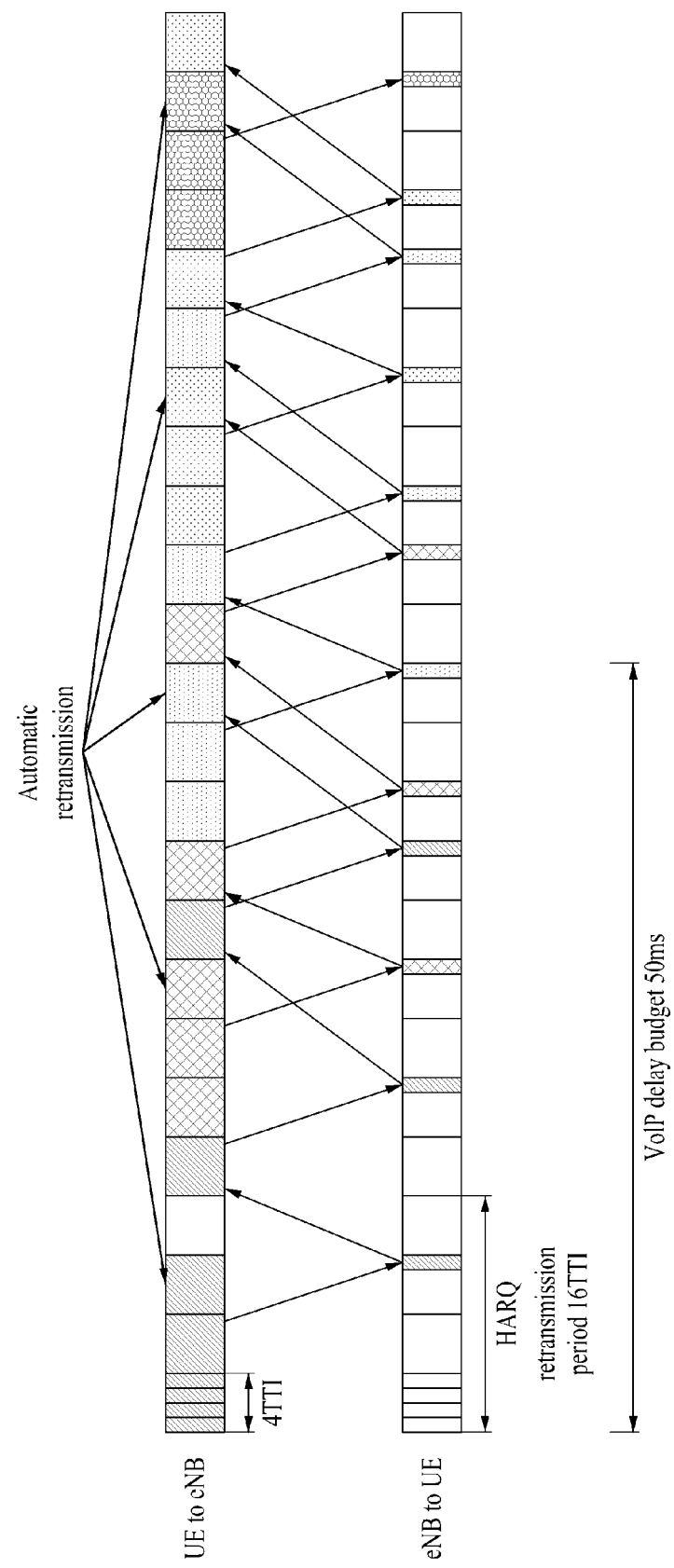

FIG. 18 illustrates an improved TTI bundling operation according to an embodiment of the present invention. In FIG. 18, a 50-ms delay budget is assumed.

Referring to FIG. 18, a UE transmits only an initial transmission VoIP packet in a bundle of 12 TTIs and then performs a packet retransmission in a bundle of 4 TTIs. Unlike the example of FIG. 17, an eNB transmits a PHICH to the UE by further receiving 4 TTIs in addition to the first 4 TTIs in the case of an initial VoIP packet transmission from the UE. If the eNB transmits the PHICH after receiving all 8 TTIs following the 4-TTI initial transmission, a PHICH retransmission period exceeds 16 ms, which is not preferable. Therefore, it is preferred that the eNB transmits a PHICH after additionally receiving only 4 TTIs at a 4-TTI initial transmission and an automatic retransmission is performed in the following 4 TTIs. Accordingly, a PHICH period is 12 TTIs between first and second PHICHs and changed to 16 TTIs between the second and third PHICHs. The PHICH period change may be set by a physical layer signal or a higher-layer signal. Or it may be agreed in advance between the UE and the eNB that if a TTI bundling size (e.g. a value of TTI_BINDLE_SIZE) is set to 5 or larger, they operate with a changed PHICH period.

It is noted from the foregoing description (particularly, the description of FIGS. 16 and 18) that a TTI bundle size is larger for an initial VoIP packet transmission than for a subsequent packet retransmission. In this manner, the TTI bundle size may vary flexibly according to the present invention. The flexible change of a TTI bundle size includes changing a TTI bundle size in the middle of a retransmission as described later in a third embodiment of the present invention as well as changing a TTI bundle size after an initial packet transmission as illustrated in FIGS. 16 and 18.

Embodiment 2

The foregoing embodiment of the present invention is about an improved TTI bundling operation in the case where an SPS period is set in accordance with the 20-ms VoIP packet arrival rate defined in the 3GPP LTE/LTE-A system. Another embodiment of the present invention provides a method for preventing collision between an HARQ retransmission and a new VoIP packet by changing an SPS period. Since the 3GPP LTE/LTE-A system defines an HARQ retransmission period of 16 ms and adopts synchronous UL HARQ, it is difficult to change the HARQ retransmission period. Compared to the foregoing embodiment in which the number of aggregated TTIs is increased by automatic retransmission or initial extended bundling in non-reserved subframes for an HARQ retransmission and a new packet, collision between an HARQ retransmission and a new VoIP packet is prevented by setting an SPS period to a value other than a multiple of 16 ms in another embodiment of the present invention.

Figure 19:
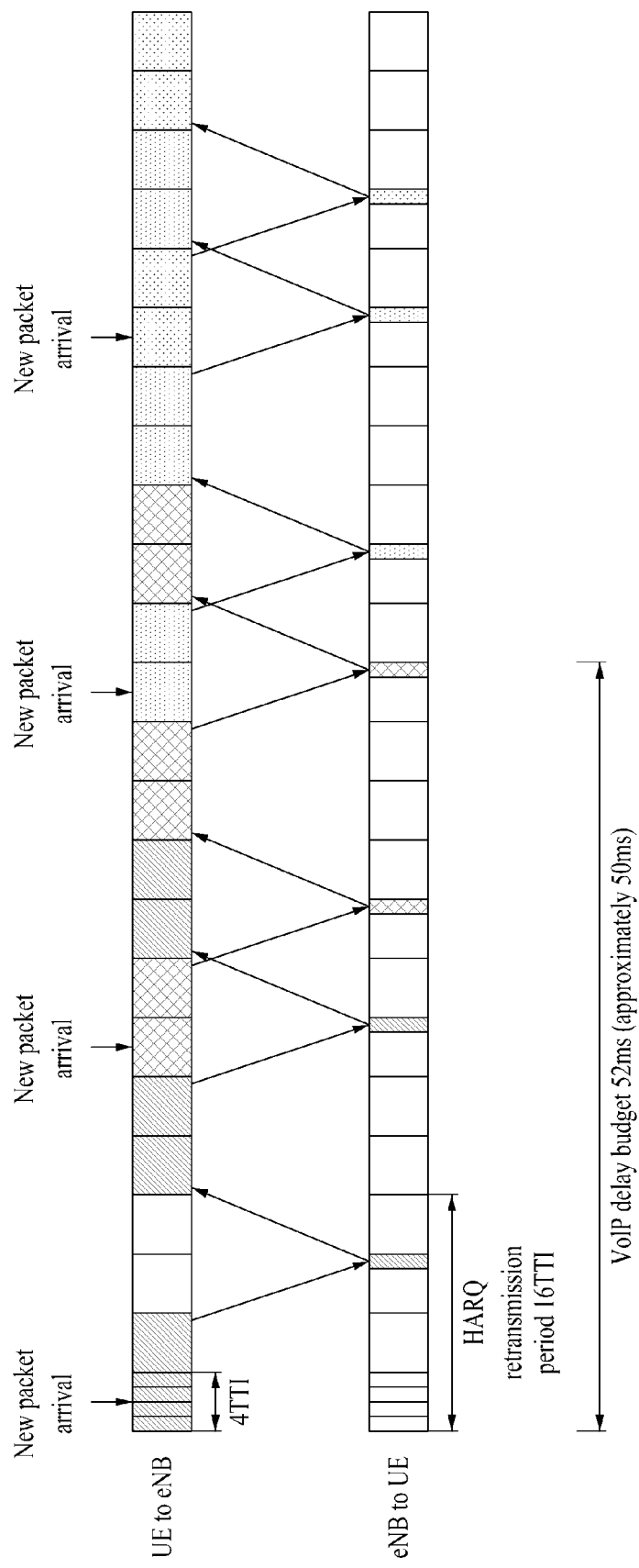

FIG. 19 illustrates an improved TTI bundling operation according to an embodiment of the present invention. In FIG. 19, it is assumed that the delay budget is 52 ms and the SPS period is 24 ms.

Referring to FIG. 19, a UE transmits each of an initial transmission VoIP packet and an HARQ retransmission packet in a bundle of 8 TTIs. An eNB transmits a PHICH to the UE after 4 TTIs from reception of all of the 8 TTIs. Upon receipt of a NACK signal from the eNB, the UE performs an HARQ retransmission after 4 TTIs from reception of a subframe carrying the A/N signal. In this manner, for an SPS period of 24 ms, no collision occurs between consecutive 8-TTI bundles and a new VoIP packet and up to 2 HARQ retransmissions are available to satisfy the 50-ms delay budget. To support this operation, it is preferable to change a TB size. For example, a 288-bit data packet is generated every 20 ms in the case of a 12.2-kbps Adaptive Multi-Rate (AMR) VoIP Coder-Decoder (CODEC). To transmit the data at a period of 24 ms, the TB size may be changed to 346 bits (=288×24/20=345.6). The reconfigured packet is allocated and transmitted by SPS with a period of 24 ms.

Embodiment 3

As the foregoing embodiments adopt automatic retransmission or change an SPS period, they need partial adjustment of a timeline of data transmission or PHICH transmission in the conventional 4-TTI bundling operation. A third embodiment of the present invention provides an improved TTI bundling technique to which an existing timeline is applicable.

If 8-TTI bundling is used as it is as illustrated in the example of FIG. 13, collision with a new packet occurs. In this case, a UE may select a new VoIP packet or an HARQ retransmission packet of a previously transmitted packet for transmission in a collision area and transmit only the selected packet to an eNB. When the UE selects and transmits only one packet to the eNB, the eNB may determine whether the packet transmitted by the UE is a new packet or a retransmission packet by blind decoding using a Cyclic Shift (CS) of a DMRS.

As described before, conventional DMRSs are subject to CS hopping in every slot. In SPS, DMRSs are transmitted according to an initialized CS hopping pattern. To distinguish a new VoIP packet from a retransmission, if TTI_BUNDLE_SIZE is set to 5 or larger in SPS, a different CS value from that of a conventional HARQ retransmission may be allocated to the new VoIP packet so as to distinguish the new VoIP packet from the HARQ retransmission. A different CS value for each packet is already known to both the UE and the eNB and thus the eNB may identify the CS hopping pattern of DMRSs by blind decoding.

For example, a DMRS CS hopping pattern may be initialized or DMRSs may be cyclically shifted according to a specific pattern, for transmission of a new VoIP packet. The UE selects one of VoIP packets buffered in its buffer and transmits the selected VoIP packet to the eNB. Herein, the UE determines whether to transmit a retransmission packet or a new packet, determines a DMRS CS value in a predetermined method, and transmits the selected packet using the determined DMRS CS value.

In a conventional DMRS cyclic shift scheme, the UE initializes DMRSs and performs CS hopping on the DMRSs by [Equation 29].

$$c_{init} = \left\lfloor \frac{n_{ID}^{RS}}{30} \right\rfloor \cdot 2^5 + f_{ss}^{PUSCH} \quad \text{[Equation 29]}$$

If a higher layer does not set the value of $n_{ID}^{PUSCH}$ in [Equation 29] or a temporary C-RNTI is used to transmit the latest UL-related DCI for a TB related to a corresponding PUSCH transmission, $n_{ID}^{RS}=N_{ID}^{cell}$. Otherwise, $n_{ID}^{RS}=n_{ID}^{PUSCH}$.

If the higher layer does not set the value of $n_{ID}^{PUSCH}$ in [Equation 29] or a temporary C-RNTI is used to transmit the latest UL-related DCI for a TB related to a corresponding PUSCH transmission, a CS pattern (or a sequence shift pattern) $f_{ss}^{PUSCH}$ may be given as $f_{ss}^{PUSCH}=(n_{ID}^{cell}+\Delta_{ss})$ mod 30. Herein, $\Delta_{ss} \in \{0, 1, \ldots, 29\}$ may be set by the higher layer. Otherwise, $f_{ss}^{PUSCH}$ may be given as $f_{ss}^{PUSCH}=n_{ID}^{RS}$ mod 30.

When a new packet is transmitted, the CS pattern $f_{ss}^{PUSCH}$ may be set to zero or an additional offset (e.g., X) may be applied to the CS pattern $f_{ss}^{PUSCH}$ as illustrated in [Equation 30].

$$f_{ss}^{PUSCH}=(n_{ID}^{cell}+\Delta_{ss}+X) \bmod 30 \quad \text{[Equation 30]}$$

If an offset is applied as described in [Equation 30], the eNB may blind-decode a CS. If the CS value has been shifted by the offset, the eNB may determine that the packet received from the UE is a new packet.

Figure 20:
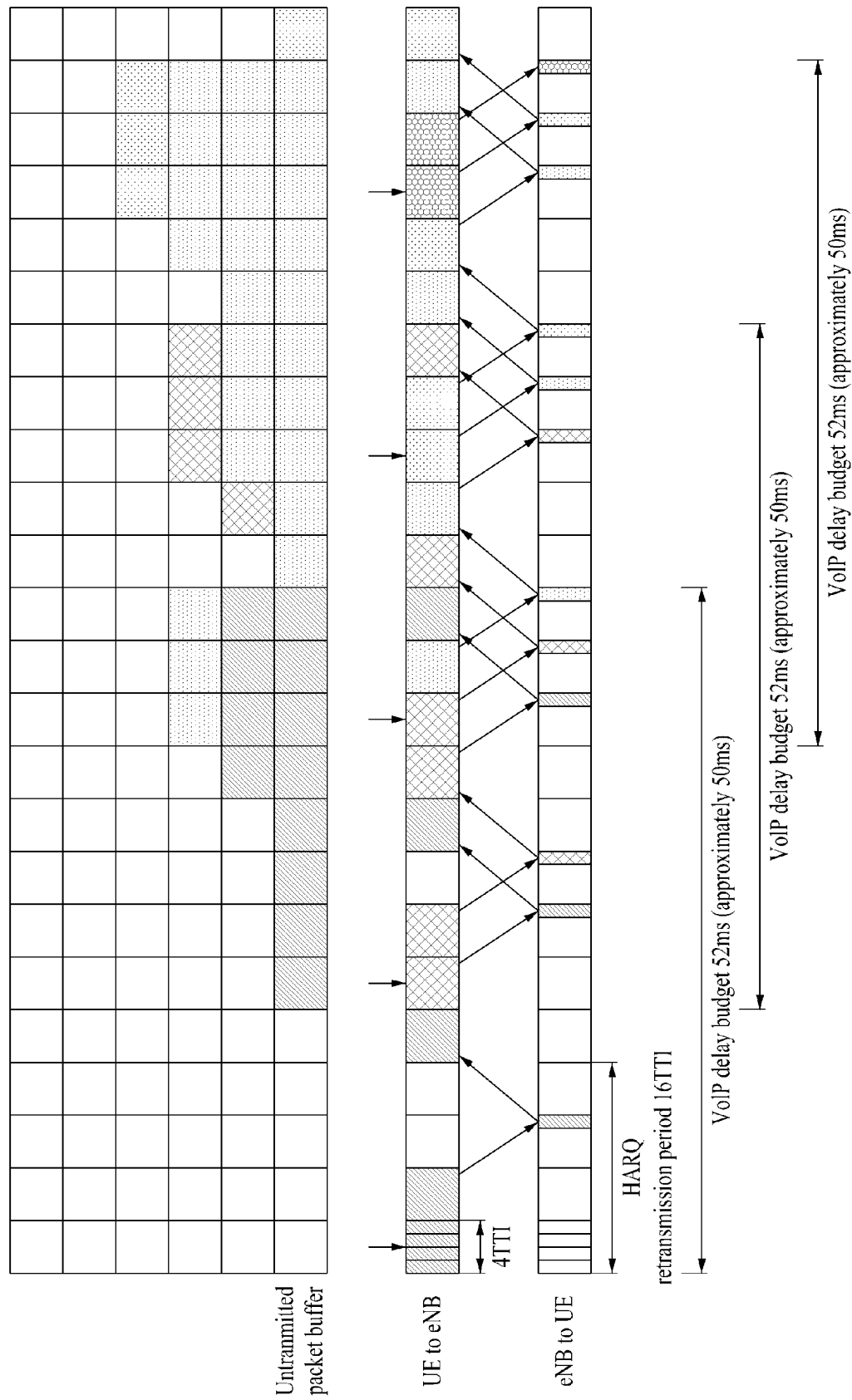
FIG. 20 illustrates an improved TTI bundling and a buffer of a User Equipment for the improved TTI bundling according to an embodiment of the present invention.

FIG. 20 illustrates an improved TTI bundling operation and a UE buffer used for the improved TTI bundling operation according to an embodiment of the present invention.

Referring to FIG. 20, it is noted that the HARQ period of the conventional 4-TTI bundling is still used, the SPS period is 20 ms equal to the VoIP packet arrival period, and the PHICH duration is not changed. However, an operation for emptying a packet exceeding a VoIP packet latency constraint (52 ms in FIG. 20) after an initial transmission, in units of 4 TTIs in the buffer of the UE is repeated in consideration of the VoIP packet latency.

Apparatus to which the Present Invention is Applicable

Figure 21:
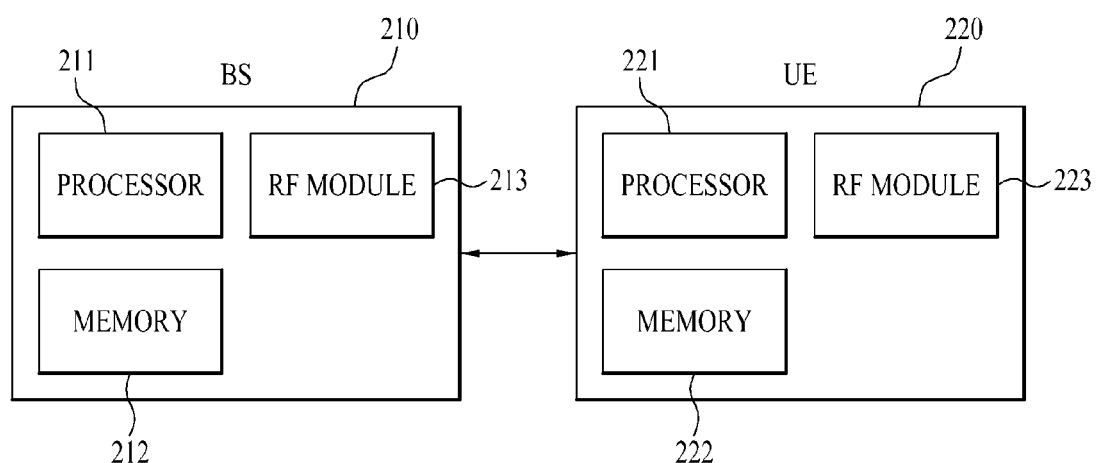
FIG. 21 is a block diagram of a wireless communication apparatus according to an embodiment of the present invention.

FIG. 21 is a block diagram of a wireless communication apparatus according to an embodiment of the present invention.

Referring to FIG. 21, the wireless communication system includes an eNB 210 and a plurality of UEs 220 within the coverage of the eNB 210.

The eNB 210 includes a processor 211, a memory 212, and a Radio Frequency (RF) unit 213. The processor 211 performs proposed functions, operations, and/or methods. The processor 211 may implement radio interface protocol layers. The memory 212 is connected to the processor 211 and stores various types of information to operate the processor 211. The RF unit 213 is connected to the processor 211 and transmits and/or receives wireless signals.

A UE 220 includes a processor 221, a memory 222, and an RF unit 223. The processor 221 performs proposed functions, operations, and/or methods. The processor 221 may implement radio interface protocol layers. The memory 222 is connected to the processor 221 and stores various types of information to operate the processor 221. The RF unit 223 is connected to the processor 221 and transmits and/or receives wireless signals.

The memories 212 and 222 may reside inside or outside the processors 211 and 221, respectively. The eNB 210 and/or the UE 220 may have a single antenna or multiple antennas.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While various embodiments of the present invention have been described in the content of a 3GPP LTE system, they are applicable to many other wireless access systems than the 3GPP LTE system.

The invention claimed is:

1. A method for performing retransmission for Transmission Time Interval (TTI) bundling in a wireless access system, the method comprising:
    transmitting, by a user equipment (UE), a first uplink data via bundled subframes;
    receiving a first PHICH (Physical Hybrid-Automatic Repeat and Request (HARQ) Indicator Channel) corresponding to the first uplink data in a 4th subframe from a last subframe of the bundled subframes;
    transmitting, by the UE after the first PHICH, a second uplink data that is a retransmission of the first uplink data via the bundled subframes; and
    receiving a second PHICH corresponding to the second uplink data,
    wherein a PHICH duration is changed from 12 TTIs to 16 TTIs even if the second PHICH corresponds to a negative acknowledgement (NACK), when a higher layer signaled parameter related to a HARQ period indicates a change of the HARQ period, and
    wherein the PHICH duration corresponds to a number of subframe between the first PHICH and the second PHICH.

2. The method according to claim 1, wherein a number of subframes between a starting point of the bundled subframes and a retransmission subframe is 12, when the higher layer signaled parameter related to the HARQ period indicates the change of the HARQ period.

3. The method according to claim 2, wherein acknowledgement (ACK)/NACK information is transmitted after 4 TTIs from 4 TTIs used for automatic retransmission, and the number of bundled subframes is 4.

4. The method according to claim 1, wherein a period of a HARQ retransmission is 16 TTIs.

5. The method according to claim 1, wherein a packet is a Voice over Internet Protocol (VoIP) packet.

6. A User Equipment (UE) for performing retransmission for Transmission Time Interval (TTI) bundling in a wireless access system, the UE comprising:
    a Radio Frequency (RF) unit configured to transmit and receive radio signals;
    and a processor coupled to the RF unit;
    wherein the processor is configured to:
    receive a first PHICH (Physical Hybrid-Automatic Repeat and Request (HARQ) Indicator Channel) corresponding to a first uplink data in a 4th subframe from a last subframe of bundled subframes,
    transmit, after the first PHICH, a second uplink data that is a retransmission of the first uplink data via the bundled subframes, and
    receive a second PHICH corresponding to the second uplink data,
    wherein a PHICH duration is changed from 12 TTIs to 16 TTIs even if the second PHICH corresponds to a negative acknowledgement (NACK), when a higher layer signaled parameter related to a HARQ period indicates a change of the HARQ period, and
    wherein the PHICH duration corresponds to a number of subframe between the first PHICH and the second PHICH.

7. The UE according to claim 6, wherein a number of subframes between a starting point of the bundled subframes and a retransmission subframe is 12, when the higher layer signaled parameter related to the HARQ period indicates the change of the HARQ period.

8. The UE according to claim 7, wherein acknowledgement (ACK)/NACK information is transmitted after 4 TTIs from 4 TTIs used for automatic retransmission, and the number of bundled subframes is 4.

9. The UE, according to claim 6, wherein a period of a HARQ retransmission is 16 TTIs.

10. The UE according to claim 6, wherein a packet is a Voice over Internet Protocol (Vo IP) packet.

* * * * *